United States Patent [19]
Borenstein

[11] Patent Number: 5,559,696
[45] Date of Patent: Sep. 24, 1996

[54] MOBILE ROBOT INTERNAL POSITION ERROR CORRECTION SYSTEM

[75] Inventor: Johann Borenstein, Ann Arbor, Mich.

[73] Assignee: The Regents of the University of Michigan, Ann Arbor, Mich.

[21] Appl. No.: 194,873

[22] Filed: Feb. 14, 1994

[51] Int. Cl.$^6$ ................................................. G01C 21/12
[52] U.S. Cl. .................. 364/424.02; 364/450; 364/453; 371/67.1
[58] Field of Search ..................... 364/424.01, 424.02, 364/449, 450, 453, 457, 460, 571.01; 340/988, 992; 342/450, 457, 463, 465; 371/67.1

[56] References Cited

U.S. PATENT DOCUMENTS

| | | | |
|---|---|---|---|
| 4,541,049 | 9/1985 | Ahlbom | 364/424.02 |
| 4,758,059 | 7/1988 | Thoone et al. | 364/449 X |
| 4,847,769 | 7/1989 | Reeve | 364/424.02 |
| 5,122,960 | 6/1992 | Ooka | 364/449 |
| 5,172,322 | 12/1992 | Takano et al. | 364/449 |
| 5,194,872 | 3/1993 | Musoff et al. | 364/453 X |
| 5,247,466 | 9/1993 | Shimada et al. | 364/453 X |
| 5,278,424 | 1/1994 | Kagawa | 364/450 X |
| 5,307,278 | 4/1994 | Hermans et al. | 364/450 |
| 5,311,195 | 5/1994 | Mathis et al. | 342/457 X |
| 5,317,515 | 5/1994 | Matsuzaki | 364/450 X |
| 5,345,382 | 9/1994 | Kao | 364/457 X |
| 5,374,933 | 12/1994 | Kao | 364/449 X |

OTHER PUBLICATIONS

Banta, L., 1988, "A self Tuning Navigation Algorithm" Proceedings of the 1988 IEEE International Conference on Robotics and Automation, Philadelphia, Apr. 25, 00. 1313–1314.

Crowley, J. L., 1989, "Asynchronous Control of Orientation and Displacement in a Robot Vehicle," Proceedings of the 1989 IEEE International Conference on Robotics and Automation, Scottsdale, Arizona, May 14–19, pp. 1277–1282.

McGillem, C. D. and Rappaport, T. S., 1990, A Beacon Navigation Method for Autonomous Vehicles, IEEE Transactions on Vehicular Technology, vol. 38, No. 3, Aug. pp. 132–139.

Figueroa, F. and Barbieri, E., 1991, An Ultrasonic Ranging System for Structural Vibration Measurements. IEEE Transactions on Instrumentation and Measurement. vol. 40, No. 4, Aug. pp. 764–769.

Barshan, B. and Kuc, R., 1992, Active Sonar for Obstacle Localization Using Envelope Shape Information. Proceedings of the 1991 IEEE Int. Conf. on Acoust. Speech Signal Processing. Toronto Ontario, Canada, May 14–17, pp. 1273–1276.

*Primary Examiner*—Collin W. Park
*Attorney, Agent, or Firm*—Harness, Dickey & Pierce, PLC

[57] ABSTRACT

An improved device and method for performing accurate mobile robot dead-reckoning by performing Internal Position Error Correction (IPEC) which corrects systematic as well as non-systematic dead-reckoning errors. A first variation utilizes a smart encoder trailer which adapts an existing dead-reckoning mobile robot. A second variation provides a pair of robotic vehicles coupled with a compliant linkage which monitors relative positioning between the vehicles in order to perform internal position error correction. A third and final variation utilizes a pair of decoupled mobile robotic vehicles, each performing dead-reckoning, further provided with individual transmitter and receiver arrays which determine relative positioning therebetween in order to perform internal position error correction.

14 Claims, 9 Drawing Sheets

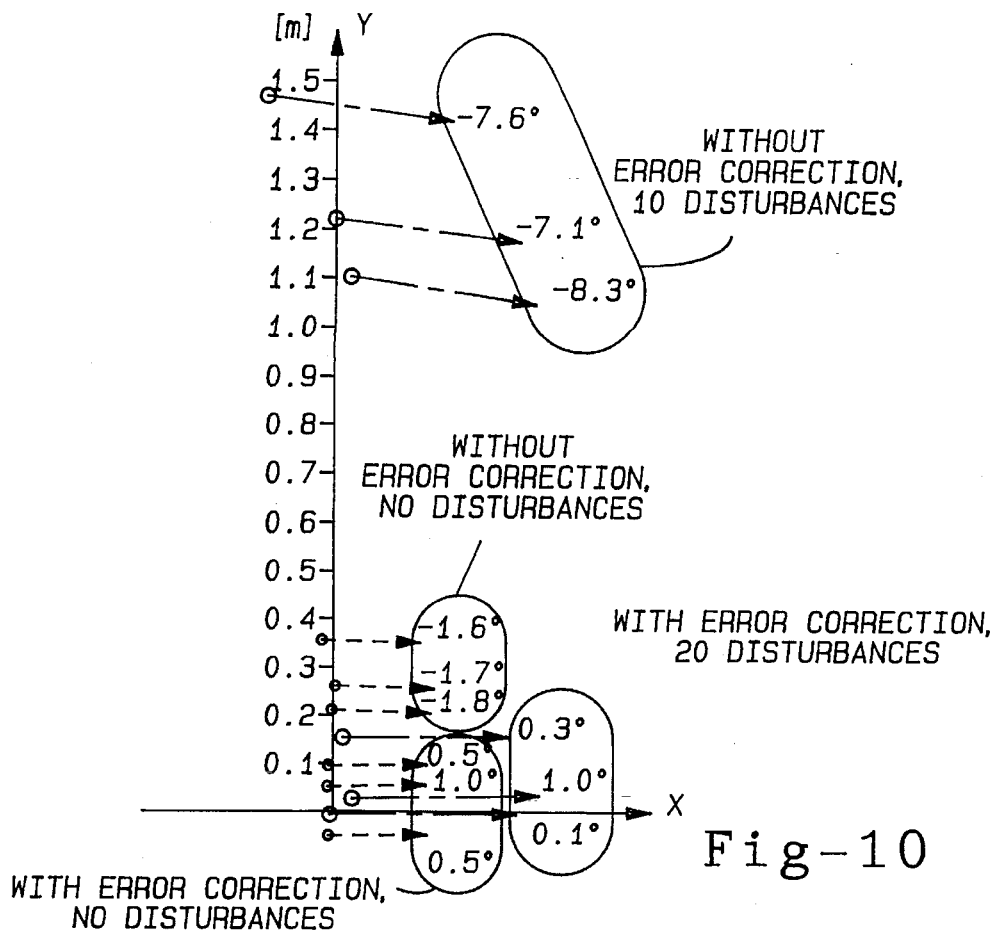
Fig-10
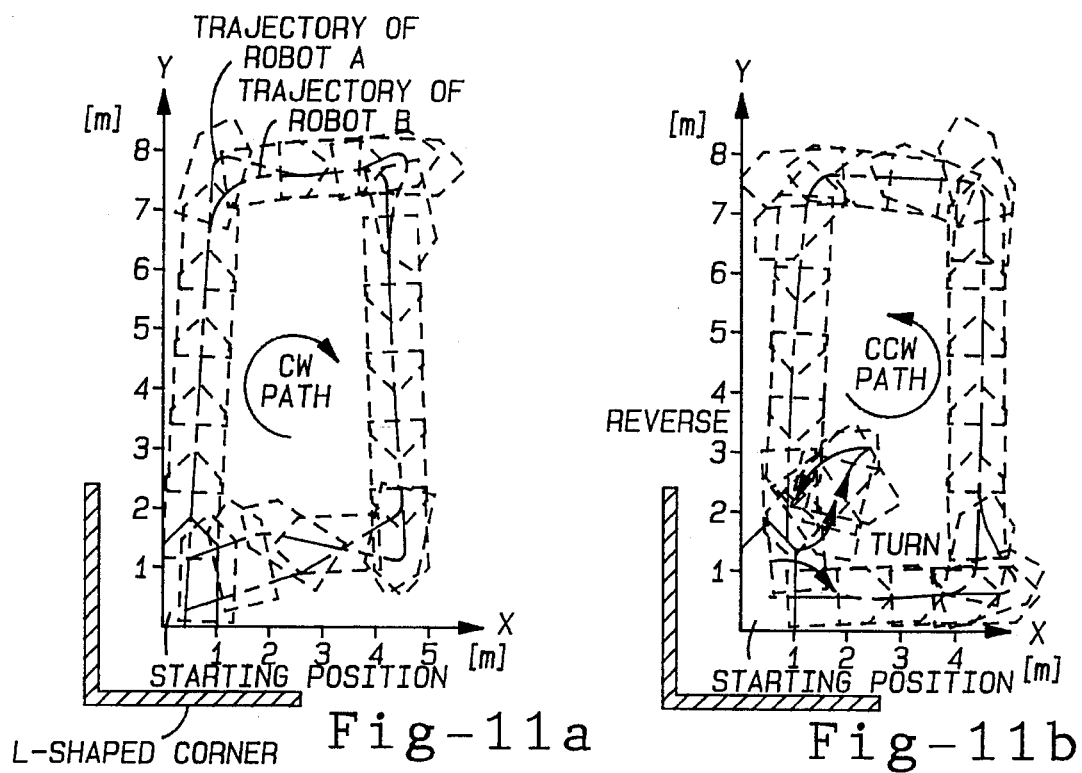
Fig-11a
Fig-11b

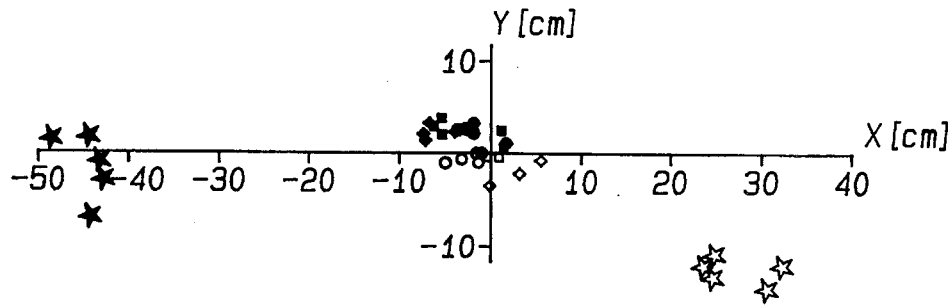
| | AVERAGE ABSOLUTE ORIENTATION ERROR | AVERAGE ABSOLUTE POSITION ERROR |
|---|---|---|
| WITH IPEC* WITH BUMPS | 0.30° | 3.1 cm |
| WITHOUT BUMPS | 0.23° | 2.3 cm |
| WITHOUT IPEC* WITH BUMPS | 7.21° | 38.3 cm |
*IPEC=INTERNAL POSITION ERROR CORRECTION
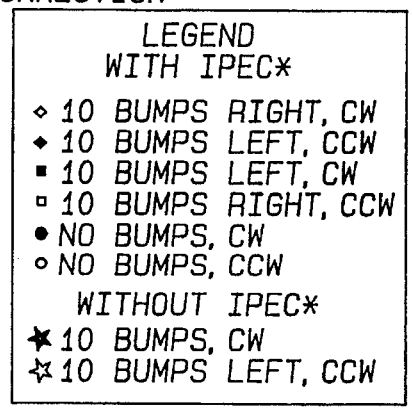
Fig-12
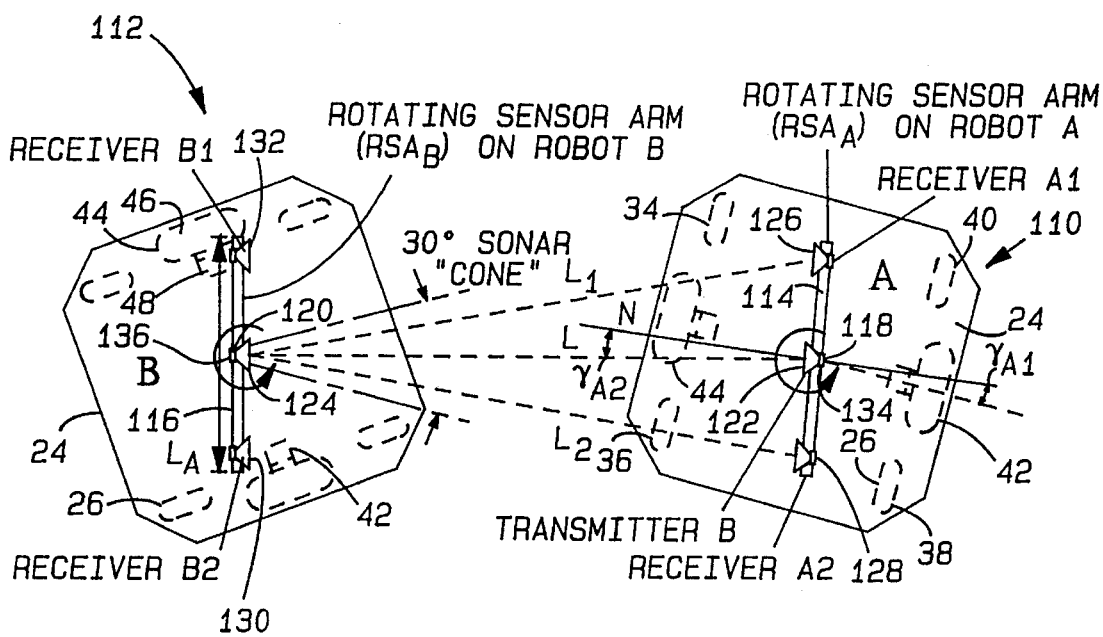
Fig-13

MOBILE ROBOT INTERNAL POSITION ERROR CORRECTION SYSTEM

FIELD OF THE INVENTION

This invention relates generally to mobile robot dead-reckoning, and more specifically to a system for internal correction of dead-reckoning errors of mobile robots using a pair of dead-reckoning mobile robotic vehicles which move together in a known and measurable relative position therebetween for correcting such dead-reckoning errors.

BACKGROUND OF THE INVENTION

In mobile robot applications, absolute and relative position-estimation methods are typically employed together to determine the position of a mobile robot. Absolute position-estimation methods typically employ external references for determining accurate robot positioning. Relative position-estimation methods typically employ wheel encoders which monitor robot wheel revolutions to compute the robots offset from a known starting position, and as such, calculate relative positioning utilizing dead-reckoning. A third technique for determining position of mobile robots is based on inertia navigation, utilizing gyros and/or accelerometers.

Typical absolute positioning methods utilize navigation beacons, active or passive landmarks, map-matching, or satellite-based navigation signals in combination with a variety of sensors and methods for receiving and monitoring such signals to determine robot positioning. However, each of these systems is limited in their application. For example, navigation beacons and landmarks usually involve costly installation and maintenance. Likewise, map-matching methods are typically very slow and inaccurate, and in many cases prove unreliable. Additionally, all of the aforementioned methods require that the robot's work environment is either carefully prepared or its topology is known and can be mapped with great precision. Furthermore, satellite-based navigation can not be used indoors and its accuracy is significantly reduced when it is used in real-time to measure moving objects. Furthermore, each of the aforementioned systems is somewhat cumbersome and difficult to utilize.

Relative positioning methods are typically based on dead-reckoning by monitoring selected robot wheel revolutions to compute the robot's offset from a known initial starting position. Typically, a plurality of wheel encoders is utilized on the robot to accurately measure wheel revolutions, and these wheel encoders are utilized in a spaced apart array to determine distance and bearing of the robot. Such a dead-reckoning system is simple, inexpensive, and easy to accomplish in real-time. However, dead-reckoning, especially with wheel encoders, proves to be inaccurate due to accumulation of dead-reckoning errors which accumulates to such a large extent that the robot's internal position estimate can be completely wrong after only 10 to 15 meters of travel distance. Recent attempts have been made to improve existing wheel encoder attachments in order to reduce the dead-reckoning errors by providing carefully machined precision wheels that are more accurate at measuring than the robots drive wheels. Ordinary robot drive wheels prove unsuitable for dead-reckoning since they are actually designed for multiple functions such as load-bearing, driving, and position measuring. By providing encoder-wheel attachments to a robot already having wheels, dead-reckoning accuracy can be improved to an extent, but severe measurement errors are still encountered when traveling over bumps, cracks, or other irregularities on a floor surface being transited by a robot.

Inertia navigation methods for determining robot position typically employ gyros and/or accelerometers. However, utilization of accelerometers produces data which must be integrated twice in order to yield displacement positioning, which makes these sensors exceedingly sensitive to drift phenomenon. The sensor drift produces error accumulation which is compounded by integrating the error component twice. An additional problem is created with accelerometer sensors when very small accelerations are measured, on the order of 0.01 G's. However, an acceleration of this magnitude is also created if the accelerometer is not positioned perfectly horizontally, for example, if it is off by only 0.5° due to the vehicle driving over uneven floors, and this causes difficulty in discriminating between any small deceleration and the deceleration component caused by uneven positioning of the robot. In place of accelerometers, gyros can be utilized and their use can produce more accurate, but more costly position information on the rotation of a robot. However, they do not provide displacement information. Moreover, gyros introduce a significant drift problem. The drift is particularly significant in gyros because gyros measure rotational velocity, which then needs to be integrated to compute rotational orientation, and the integration magnifies any drift component.

SUMMARY OF THE INVENTION

A mobile robot positioning system of this invention performs internal correction of dead-reckoning errors between a pair of spaced apart mobile robotic vehicles. An accurate relative positioning system is provided between the pair of vehicles, and each has a dead-reckoning system for determining its position relative to the other vehicle so that systematic and non-systematic dead-reckoning errors can be detected and corrected for each vehicle. Preferably, one of the robotic vehicles is an existing robot or mobile machine which has wheel encoders, and the other vehicle is a robotic trailer with spaced apart wheel encoders, both vehicles encoders functioning to perform dead-reckoning in order to correct for systematic and non-systematic dead-reckoning errors of the primary vehicle and robotic trailer. Alternatively, the system of this invention can consist of a pair of robotic vehicles joined by a rotatably and axially compliant linkage which senses relative distance and bearing between the vehicles in order to perform dead-reckoning error correction. In a third variation, a pair of decoupled and spaced apart robotic vehicles communicate through an array of antenna receivers and transmitters to sense relative distance and bearing between the vehicles in order to determine and correct systematic and non-systematic dead-reckoning errors between the vehicles.

Objects, features and advantages of this invention are to provide a mobile robot positioning system which provides at least an order of magnitude better positioning accuracy than current conventional dead-reckoning systems and which can also be provided on an existing robot by attaching a robotic trailer to the robot vehicle, and which does not require external references such as navigation beacons or satellite signals nor inertia navigation aids such as accelerometers or gyros and which can distinguish between dead-reckoning errors that develop slowly from other dead-reckoning errors which develop quickly in order to provide robots for indoor use, or for map-building and exploratory tasks where conventional absolute position sensors prove unfeasible, and which eliminates the need for guide wires or external devices to monitor robot position, and in a system which is stable, rugged, durable, reliable, easy to implement in a new environment, and of adaptable design and economical manufacture.

Further objects, features and advantages of the invention will become apparent from a consideration of the following description and the appended claims when taken in connection with the accompanying drawings.

BRIEF DESCRIPTION OF THE DRAWINGS

FIG. 10 is a cumulative plot depicting return position errors for the second embodiment resulting from a straight path experiment;

FIG. 11A is a cumulative diagram depicting trajectories for the mobile robot positioning system of the second embodiment performing a clockwise rectangular path experiment;

FIG. 11B is a cumulative diagram depicting projectories for the mobile robot positioning system of the second embodiment performing a counter-clockwise rectangular path experiment;

FIG. 12 is a cumulative plot depicting return position errors upon completing the rectangular path experiment of FIGS. 11A and 11B;

FIG. 13 is a plan view of a third embodiment of the mobile robot positioning system according to the present invention illustrating a pair of decoupled mobile robotic vehicles with corresponding transmitters and receivers for detecting robot position;

DETAILED DESCRIPTION

PREFERRED EMBODIMENT: SMART ENCODER TRAILER

Figure 1:
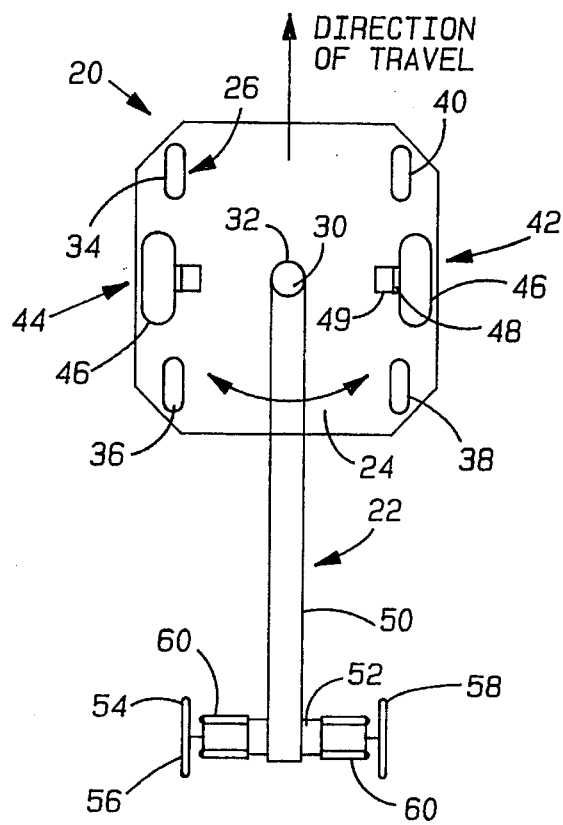
FIG. 1 is a plan view of one embodiment of the mobile robot positioning system according to the present invention illustrating an existing mobile robot towing a smart encoder robot trailer.
Figure 2:
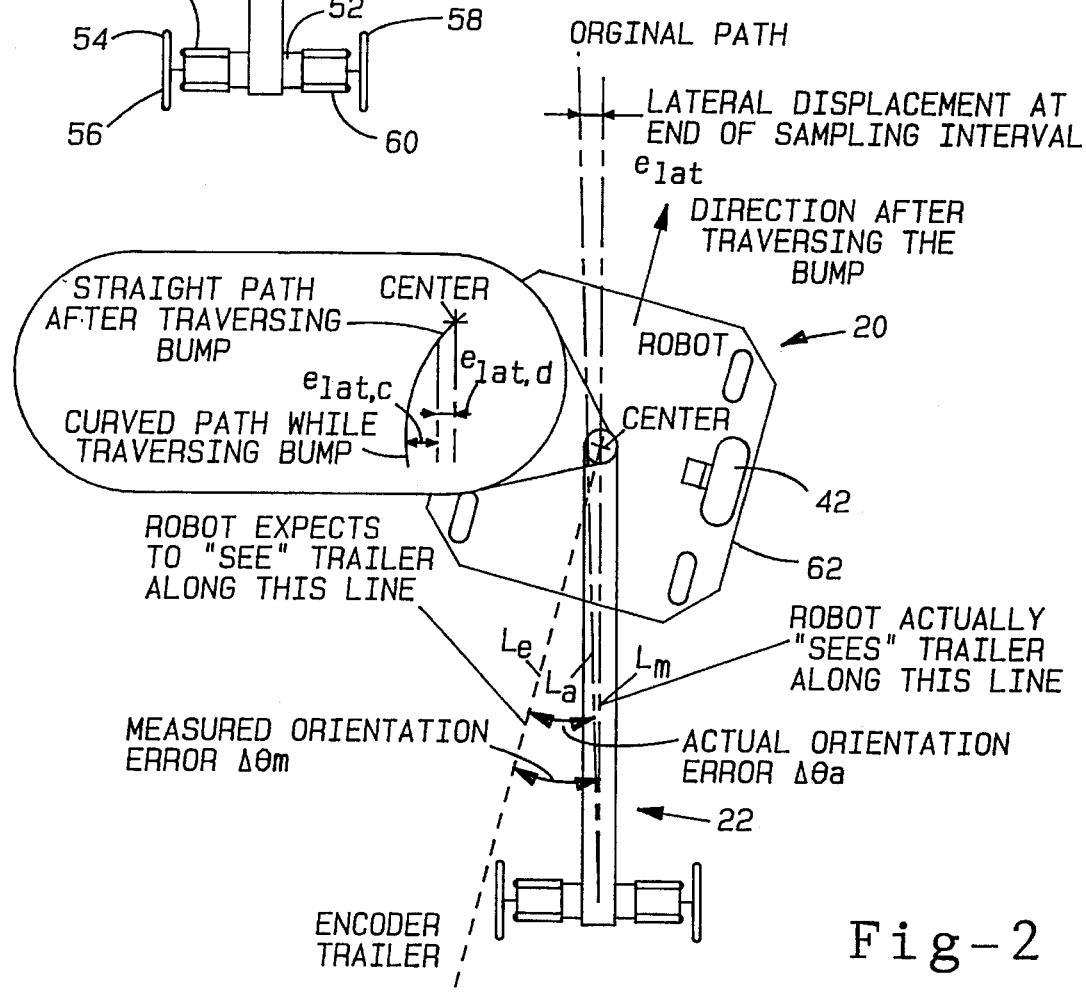
FIG. 2 is a plan view of the robot positioning system illustrated in FIG. 1 showing the robot and trailer after traversing a bump which causes a change in orientation of the robot.

Referring in more detail to the drawings, FIGS. 1 and 2 illustrate a conventional dead-reckoning mobile robot 20 which is rotatably coupled to a smart encoder trailer 22 for correcting dead-reckoning errors. The robot and trailer communicate while measuring and calculating orientation error of the mobile robot and trailer due to systematic as well as nonsystematic dead-reckoning errors. The smart trailer can be readily adapted for attachment to existing conventional robots with dead-reckoning systems, or for use on various other self-propelled robotic vehicles, including farm implement vehicles which are adapted to perform dead-reckoning. The smart encoder trailer measures position and bearing with respect to the robot and the robot measures position and bearing with respect to the trailer. With this information, the robot and trailer cooperate to correct dead-reckoning errors without using any external references which are frequently used with absolute positioning systems such as satellite-based navigation.

Preferably, smart encoder trailer 22 is towed by a conventional dead-reckoning mobile robot 20, for example a LabMate robot purchased from Transition Research Corporation (TRC), 15 Great Pasture Road, Danbury, Conn., 06810. The robot has a body 24 with a chassis 26. The trailer is preferably connected to the center of the robot 28 with a trailer hitch 30 which incorporates a rotary encoder 32 for measuring the angular position of the trailer with respect to the robot. A spaced apart array of caster wheels 34–40 are carried by the chassis to movably support the robot on a topographical surface. A pair of precision encoder drive wheels 42 and 44 are further carried on the chassis. The drive wheels are spaced apart with one on either side of the robot to facilitate translation and rotation measurement of the robot as it travels over a surface. Each encoder drive wheel is carried on a shaft encoder 48 extending from a drive motor 49 which allows conventional dead-reckoning between the pair of encoder drive wheels relative to the robot. Furthermore, each drive wheel is provided with a rubber tire 46 which frictionally contacts the travelled surface where it maintains in rolling contact to accurately measure motion of the robot with respect to the surface. By accurately monitoring the rotation of each drive wheel, conventional dead-reckoning techniques allow calculation of position and bearing for the robot as it travels over smooth and clean surface.

The smart encoder trailer 42 is coupled at a first end to the mobile robot 20 with hitch 30 which supports rotary encoder 32. An extension link 50 forms the main body of the trailer and provides a rigid T-axle 52 at a second end of the trailer which supports a pair of measurement wheels 54 and 56 for determining dead-reckoning of the second end of the trailer. Each measurement wheel is provided with a frictionally engaging tire 58 rotatably carried by a rotatable shaft encoder 60 for accurately measuring rotation of the wheel with respect to the trailer. By monitoring the absolute rotary encoder 32 at the first end of the trailer and the wheel encoders 58 on each measurement wheel 54 and 56 at the second end of the trailer, the position and bearing of the trailer with respect to the position and bearing of the mobile robot can be monitored to calculate systematic and non-systematic dead-reckoning errors and then correct such errors with respect to the robot. Here, the trailer's rotary encoder and fixed length provide error discriminating means for the robot's dead-reckoning errors. Likewise, the same technique can be used to correct for dead-reckoning errors of the trailer with respect to the robot.

Non-Systematic Dead-Reckoning Errors

For example, FIG. 1 depicts a mobile robot 20 with a trailer 22 in an aligned position as they approach a bump 62 on a topographical surface. FIG. 2 depicts the same robot and trailer after drive wheel 42 of the robot has hit the bump which changes the orientation of the robot relative to the surface as well as relative to the trailer. Such a bump is typical of a category of dead-reckoning errors known as "non-systematic dead-reckoning errors" frequently found in mobile robot navigation. Typical surfaces on concrete or asphalt floors are strewn with cracks, bumps, as well as debris, along with any inherent roughness and abnormalities on the floor surface. Such irregularities are found in varying degrees on all surfaces, and their degree of prevalence is highly dependent on an ability to control the work environment in which a robot is operating. Even in well-controlled environments, there is further chance that objects might be dropped by an individual, a robot, or by some external device which further complicates navigation of the robot. Because these irregularities occur in a random nature, they are considered to cause non-systematic errors in robot dead-reckoning. Additionally, non-systematic dead-reckoning errors may be caused by excessive wheel slippage, for example due to fluid or oil spills on a travelled surface or due to collisions of a robot with an object. Conventional dead-reckoning systems can not avoid nor compensate for these error sources. To better gauge in a physical sense the effect of typical non-systematic errors on a robots dead-reckoning, we have listed typical path errors resulting from a robot travelling over a bump of 10 mm height below in Table 1.

TABLE I

Sample path errors after traversing a bump [Borenstein, 1994]

| Physical Dimensions* | | | Computed Results | | |
| --- | --- | --- | --- | --- | --- |
| Wheel-base b | Wheel radius R | Height of bump h | Linear error $\Delta D$ | Orientation error $\Delta\phi_a$ (see FIG. 3) | Lateral error after 10 m travel $e_{lat}(D = 10 \text{ m})$ |
| 340 mm | 75 mm | 10 mm | 2.63 mm | 0.44° | 77 mm |

*All physical dimensions correspond to those of our LABMATE robot.

Figure 9:
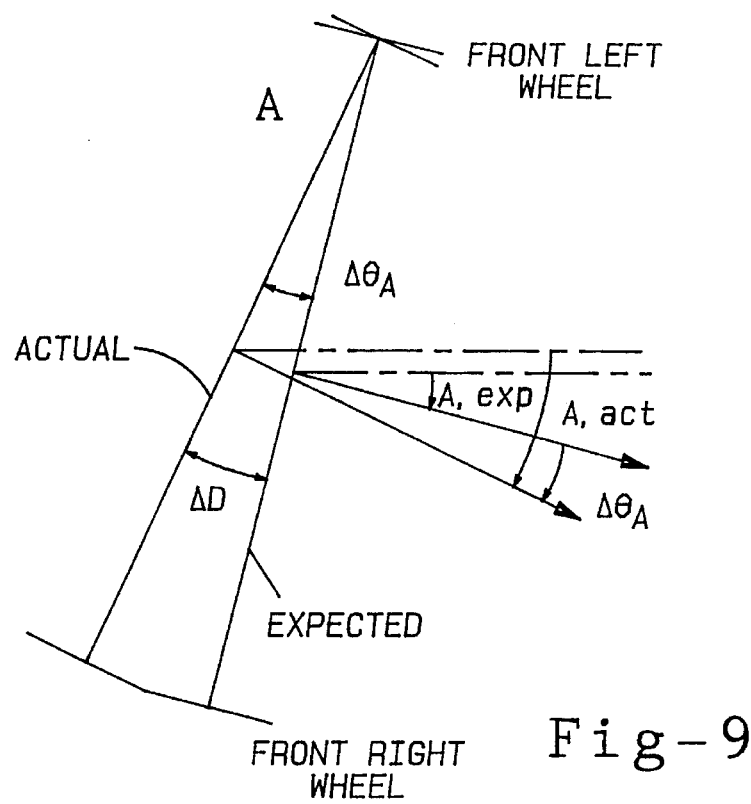
FIG. 9 is a diagrammatic representation of composite translational errors induced in the lead robot due to the bump as calculated between the lead and trailing robots.

Table 1 lists corresponding physical dimensions for a LabMate robot with a specified wheel base b and wheel radius R for a bump of specified height h. Computed results are shown for linear error $\Delta D$, orientation error $\Delta\theta_a$ and lateral error after 10 m of travel $e_{lat}(D=10 \text{ m})$. The linear error and orientation error correspond with that depicted in FIG. 9. The physical dimensions used here correspond with those for a LabMate robot as depicted in FIG. 2. From examination of Table 1, the orientation error $\Delta\theta_a$ is the most significant system error because it causes unbounded lateral error $e_{lat}$ which grows proportionally with robot travel distance at a rate of $e_{lat}(D)=D\cdot\Delta D/b=D \sin \Delta\theta_a$ (where D is the distance traveled since the robot cleared the bump, and b is the robot wheelbase). For example, Table I shows a lateral error for a robot after 10 m of travel (after clearing the bump) which is $e_{lat}(D=10 \text{ m})=77$ mm.

Additionally, a traditional robot using a conventional dead-reckoning system encounters systematic dead-reckoning errors which are errors usually caused by imperfections in the design and mechanical implementation of the mobile robot. For example, conventional differential-drive mobile robots are notorious for having different wheel diameters and uncertain effective wheel bases. These systematic errors are particularly troublesome because they accumulate constantly as the mobile robot moves. In cases where a mobile robot is traversing a smooth topographical surface, systematic errors contribute much more to dead-reckoning errors than non-systematic errors. However, on rough surfaces with significant irregularities, the non-systematic errors become dominant. One criticism of recent efforts at reducing systematic dead-reckoning errors alone is that the unexpected irregularities can introduce a huge error, no matter how effective the error reduction system.

The proposed mobile robot positioning system of this invention, as depicted in FIGS. 1 and 2, provides a new and unique method for accurately and reliably correcting dead-reckoning of an existing mobile robot by performing Internal Position Error Correction (IPEC) which will be further described below. Also described below is a Growth-Rate Concept (GRC) which is used in conjunction with the IPEC method to detect and correct non-systematic dead-reckoning errors.

In conventional mobile robots, systematic errors can be reduced to a degree by carefully mechanically designing the robot as well as by carefully calibrating a specific robot. However, systematic errors can not be eliminated completely because they frequently depend on changing factors such as load distribution, uncertain effective wheelbase caused by rubber tires contacting over a contact area, not a point contact, with uncertain effective wheelbase ranging in the order of 1% to 5% in most robots. However, we will show infra that systematic errors are also automatically corrected by the IPEC method, along with the non-systematic errors.

Internal Position Error Correction (IPEC)

Implementation of the IPEC method on the robot 20 and trailer 22 system of FIGS. 1 and 2 is best explained by referring to FIG. 2 which shows the robot and trailer direction after the robot traversed a bump 62. In this configuration, the robot's direction after traversing the bump differs from its intended (or straight ahead) direction as a result of a dead-reckoning error and the robot still "thinks" it is traveling straight ahead in its original path. As a result, the robot would expect the trailer to be centered straight behind itself, along the dotted line labeled $L_e$ in FIG. 2. Using dead-reckoning data from both the robot and the trailer, the robot can continuously compute the expected direction to the center of the trailer, whether both the robot and trailer are traveling a straight path or along a curved path. This expected direction can then be compared to the measured direction, which is readily available from the absolute rotary encoder 32 at the center of the robot 28. The difference between the expected direction and the measured direction is the measured orientation error $\Delta\theta_m$. $\Delta\theta_m$ can then be used to correct the computed orientation of the robot, which was based on dead-reckoning. Likewise, the orientation error of the trailer can be determined in a similar manner, relative to the center of the robot.

From FIG. 2, it is evident that the measured orientation error $\Delta\theta_m$ is not identical to the actual orientation error $\Delta\theta_a$, and it is not immediately apparent how the original dead-reckoning orientation can be corrected if the actual error is not known. However, $\Delta\theta_m$ is almost identical to $\Delta\theta_a$, and for the kinematic configuration of the robot and trailer system this near-identity is guaranteed under all operating conditions (except for a few known exceptions). The conceptual proof for this claim is given by the Growth Rate Concept (GRC) for dead-reckoning errors which is described infra. The kinematic relations for a more rigorous proof, although somewhat tedious, can be further shown and is currently being pursued by the inventor. However, in this trailer application, the near-identity is assumed to be actual for purposes of implementation which proves itself out in actual operation. Through experimentation, kinematic relations can be adapted to identify optimized criteria which minimize the difference between $\Delta\theta_m$ and $\Delta\theta_a$ in order to guarantee the near-identity. It has been shown by the inventor that for the second embodiment (FIG. 4) the difference between $\Delta\theta_m$ and $\Delta\theta_a$ is guaranteed to be less than 0.02 degrees.

Growth-Rate Concept (GRC) for Dead-Reckoning Errors

The IPEC method described supra utilizes a Growth-Rate Concept (GRC) when determining orientation error of the mobile robot. The GRC makes use of a distinction that certain dead-reckoning errors develop quickly, heretofore fast-growing errors, while others develop slowly, heretofore slow-growing errors. For example, in a non-holonomous vehicle, such as a differential drive mobile robot or the subject encoder trailer of FIGS. 1 and 2 where lateral motion is inhibited, it is safe to assume the vehicle or trailer does not move sideways under most normal operating conditions. This generally holds true even if the vehicle or trailer traverses a bump or crack or other irregularity on a topographical surface. Under these "normal" operating conditions, the only way a substantial dead-reckoning error can, and usually does, develop is as a result of a pre-existing initial orientation error. In other words, as the vehicle or trailer traverses a bump, it will immediately experience a significant orientation error, or a fast-growing error, which develops into a lateral position error as it travels subsequent to riding over the bump, which is a slow-growing error.

For example, the bump described in Table I causes an orientation error of $\Delta\theta_a=0.44°$. This error will "fully develop" within one or two sampling intervals, assuming sampling interval $T_s=40$ milliseconds or a few centimeters of distance travelled. This orientation error $\Delta\theta_m$ is measured by actual rotary encoder 32, and for the assumed conditions $\Delta\theta_m$ is essentially identical to $\Delta\theta_a$, the actual orientation error. Subsequently, the orientation error $\Delta\theta_m$ is corrected. In contrast, the slow-growing lateral position error at the end of one sampling interval is less than $e_{lat}=0.15$ mm, for the numeric example given in Table I. For a geometry similar to that of the robot and trailer system depicted in FIGS. 1 and 2, the preceding lateral error for the system of Table 1 reduces the accuracy of the orientation error measurement by only $\epsilon=0.01°$. The preceding holds true for the simple case where a robot encounters a bump while the trailer maintains its heading. However, even if the trailer encounters a bump during the same sampling interval as the robot, the trailer's resulting lateral error would be similarly small. Neither the lateral error of the trailer nor the orientation error of the trailer would cause a significant error in the orientation measurement of the robot relative to the trailer or vice-versa. It would be very rare that both the robot and trailer encounter a bump during the same sampling interval, unless the topographical surface is very rough. Yet, even in this extremely rare case, the inaccuracy of the orientation error measurement would be $\epsilon=2\times0.01°=0.02°$, which translates into $0.02/0.04\times100=4.5\%$ inaccuracy in measuring the orientation error of the robot relative to the trailer.

Additional Considerations of Translational Errors

The IPEC method discussed supra can detect rotational errors, but not translational errors. However, in practice rotational errors are much more severe than translational errors because the orientation errors resulting from rotational errors cause unbounded growth of lateral position errors during subsequent travel. There are two distinguishing kinds of translational errors: pure and composite. Pure translational errors occur when both trailer wheels traverse bumps of similar height during the same sampling interval. The IPEC method can not detect these errors when they occur concurrently. However, they rarely occur in practice, and when they do occur they produce only small and finite position errors. In contrast, composite translational errors occur when only one wheel traverses a bump, causing both a translational and a rotational error. With the robot and trailer system of this embodiment, the rotational error can be detected and correction-terms can be derived for the translational portion of the composite error.

Systematic Dead-Reckoning Errors

In contrast to non-systematic errors such as bumps which were addressed above with the IPEC method, another source of dead-reckoning errors is known as systematic errors. Systematic errors usually result from imperfections in the design and mechanical implementation of a mobile robot. As such, they are errors inherent in the vehicle, and in conventional, differential-drive mobile robots the two most notorious systematic errors result from different wheel diameters and uncertainty of effective wheel base.

The effect of systematic errors on dead-reckoning positioning of a robot is particularly great because these errors accumulate constantly. For example, on smooth indoor surfaces systematic errors are the primary component in dead-reckoning errors. However, on rough surfaces with significant irregularities, non-systematic errors are the dominant component. In efforts to reduce systematic dead-reckoning errors, any unexpected irregularities can introduce a huge error, no matter how effective an attempt at reducing the systematic errors. The primary advantage of the IPEC method is its ability to correct both non-systematic errors and most systematic errors, provided the systematic errors cause a dead-reckoning error in orientation. For example, a mobile robot which is programmed to move in a straight line but has unequal wheel diameters will follow a curved path instead of moving straight. The robot and trailer system of this preferred embodiment equipped with IPEC will detect rotation of the robot as it follows a curved path due to the unequal wheel diameters. The IPEC method will trigger a correction as soon as the accumulated orientation error of the robot exceeds the resolution of the absolute encoder 32. In tests utilizing a prototype, the absolute encoder triggers corrections for accumulated orientation errors of 0.3°.

FIRST ALTERNATIVE EMBODIMENT: COMPLIANT LINKAGE VEHICLE

Figure 3:
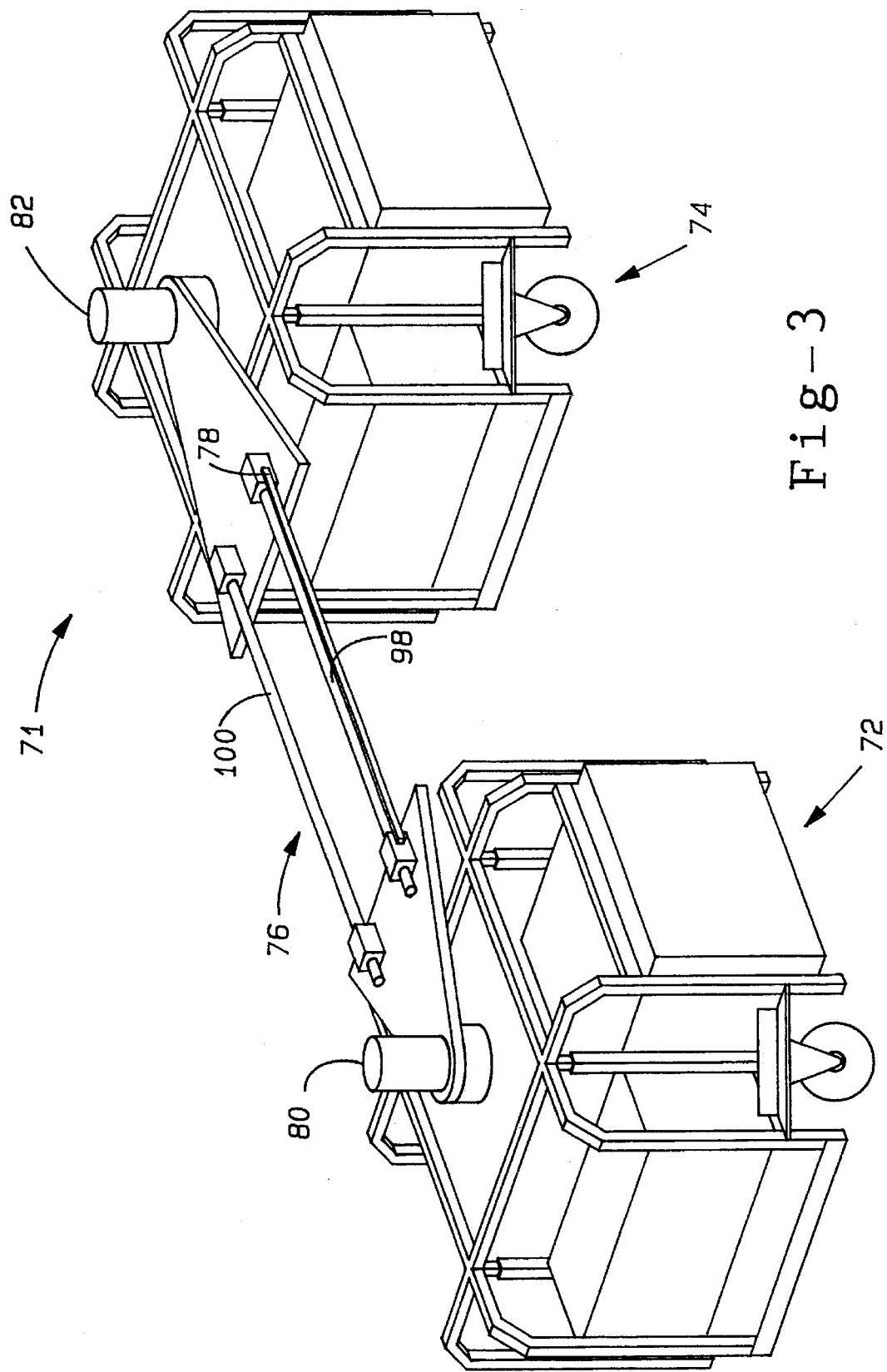
FIG. 3 is a perspective view of a second embodiment of the mobile robot positioning system according to the present invention illustrating a pair of mobile robotic vehicles joined by a compliant linkage.
Figure 4:
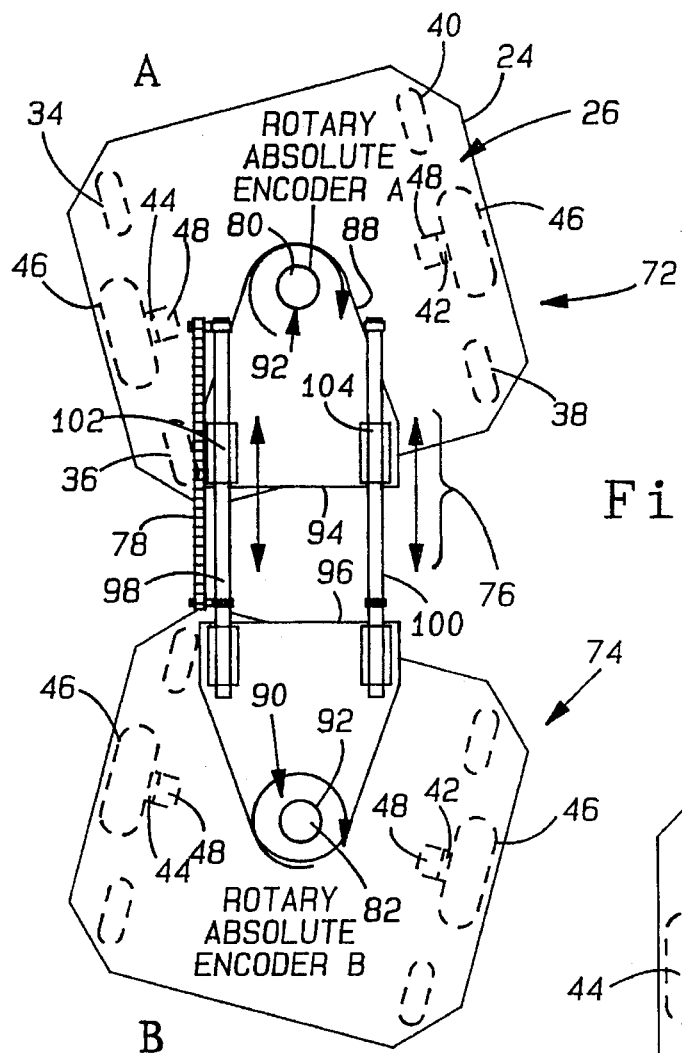
FIG. 4 is a plan view of the mobile robot positioning system illustrated in FIG. 3 showing the essential components of the compliant linkage.

As shown in FIGS. 3–12, a mobile platform vehicle was developed which performs Internal Position Error Correction (IPEC) to produce accurate and reliable dead-reckoning. A multi-degree of freedom (MDOF) vehicle is characterized here by Compliant Linkage Autonomous Platform with Position Error Recovery (CLAPPER) 71 which includes a pair of differential-drive mobile robots 72 and 74 which are physically connected through a compliant linkage 76. A linear encoder 78 is provided on the compliant linkage which measures the spaced apart relation between the robots. Additionally, a pair of rotary absolute encoders 80 and 82 are provided, one at either end of the linkage where it connects to each robot, which measures absolute rotary positioning of the linkage with respect to each robot. Referring to FIG. 4, the linkage has a first and second end with each end carrying a rotary encoder 80 and 82, respectively, which is affixed to a center 88 and 90, respectively, of each robot by a compliant pivotal hitch 92. In practice, the compliant linkage is constructed from a pair of pivot plates 94 and 96 which are pivotally supported on top of each robot 72 and 74, respectively by the pivot hitch. Compliant interconnection between the pair of plates is provided with a pair of parallel guide shafts 98 and 100 which are fixed at one end to pivot plate 96 and are compliantly and slidably received in the other end through a pair of axial collar bearings 102 and 104, respectively. Linear encoder 78 is carried on guide shaft 98 in order to measure the relative slidable motion of the shaft with respect to the collar bearing 102.

As was the case with the mobile robot detailed in the preferred embodiment supra, preferably robots 72 and 74 are LabMate robots which can be purchased commercially as detailed supra. Likewise, each robot has a body 24 and a chassis 26 and is supported on a topographical surface by four spaced apart caster wheels 34–40. Each robot is driven by a pair of encoder drive wheels 42 and 44 which are laterally spaced apart and which provide information for performing traditional dead-reckoning of each robot as it travels over a topographical surface. Likewise, each drive wheel is provided with a rubber tire 46 which maintains rolling contact with the surface and is resistant to slippage. Likewise, each drive wheel is provided with a drive motor having a shaft encoder 48 for monitoring the rotary position of each wheel.

Multi-Degree of Freedom Compliant Linkage Vehicle

Previous research by this inventor has lead to development the CLAPPER 71 which is an innovative Multi-Degree of Freedom (MDOF) vehicle with a compliant linkage as depicted in FIG. 3. The CLAPPER vehicle depicted in FIGS. 3–6 incorporates linear encoder 78 and rotary encoders 80 and 82 to perform internal position error correction (IPEC). The CLAPPER vehicle is a further modification of a previously developed MDOF vehicle which is the subject matter of a pending U.S. patent application Ser. No. 07/973,999, Multi-Degree of Freedom Vehicle, filed Nov. 10, 1992 and is hereinafter incorporated by reference. The key feature provided by this MDOF vehicle is the ability of the compliant linkage to accommodate momentary controller errors between a pair of robots' which successfully eliminates excessive wheel slippage as has been commonly reported by various makers of MDOF vehicles. Generally, MDOF vehicles provide an advantage over conventional mobile robots in that they can travel sideways and can negotiate tight turns easily. Their principal problem has been difficulty in enabling accurate control of the vehicle because of the over-constrained nature of the robots at either end. Because it is difficult to simultaneously control a pair of robots, serious difficulties are encountered with severe wheel slippage or jerky motion under certain driving conditions which results in poor dead-reckoning accuracy of these MDOF vehicles in general. Therefore, MDOF vehicles to date have not been very suitable for mobile robot applications which rely heavily on dead-reckoning. The compliant linkage of the MDOF vehicle in this inventors copending application accommodates momentary controller errors to successfully eliminate excessive wheel slippage reported by other makers of MDOF vehicles. However, this MDOF vehicle is still susceptible to the dead-reckoning errors caused by topographical irregularities and bumps which are addressed in the present subject application.

The linear incremental encoder 78 provided on the CLAPPER vehicle 71 in this embodiment of the present invention has a resolution of 0.1 mm. In use, the actual accuracy of axial distance measurements between the center points of the pair of robots 72 and 74 has been found to be only ±3 mm due to mechanical inaccuracies found in a prototype vehicle. The rotary absolute encoders 80 and 82 in practice have been found to have a resolution of 0.35°. Hereinafter, the linear encoder and pair of rotary encoders will be referred to generally as the CLAPPER vehicle's internal encoders.

Finally, experiments done by the inventor with an unmodified MDOF vehicle show control errors are effectively absorbed by the compliant linkage which results in smooth and precise motion without excessive wheel slippage. A series of 4 m×4 m square path experiments were performed in which it was found that typical dead-reckoning errors were less than 6.5 cm in the x and y directions, and orientation errors were less than ±1°. This dead-reckoning accuracy is comparable with that found on a conventional 2-DOF (degree of freedom) robots. However, these results were obtained on smooth floors without irregularities, and with well calibrated parameters to minimize systematic errors. Therefore, this analysis has been further extended to the CLAPPER vehicle 71, which is a modified MDOF vehicle, to determine its effectiveness at implementing internal position error correction (IPEC) which was already detailed in the preceding preferred embodiment and will be further described in this specific alternative embodiment infra.

Dead-Reckoning Error Considerations for CLAPPER Vehicle

As was described infra in the robot and trailer preferred embodiment of this invention, non-systematic and systematic errors occur when performing dead-reckoning navigation with the CLAPPER mobile robot vehicle. The Growth-Rate Concept which was also discussed infra is further discussed with respect to its application on the CLAPPER vehicle. Likewise, various changes with respect to the Internal Position Error Correction (IPEC) method as applied to the CLAPPER vehicle are further discussed.

Figure 5:
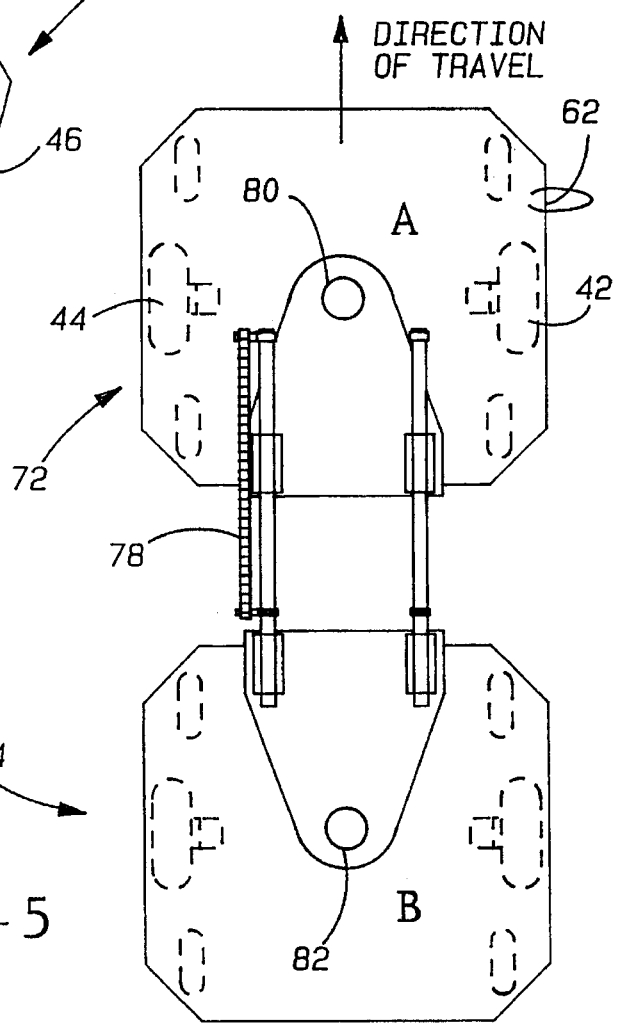
FIG. 5 is a plan view of the mobile robot positioning system illustrated in FIGS. 3 and 4 showing the initial configuration of both robots before the lead robot hits a bump.
Figure 6:
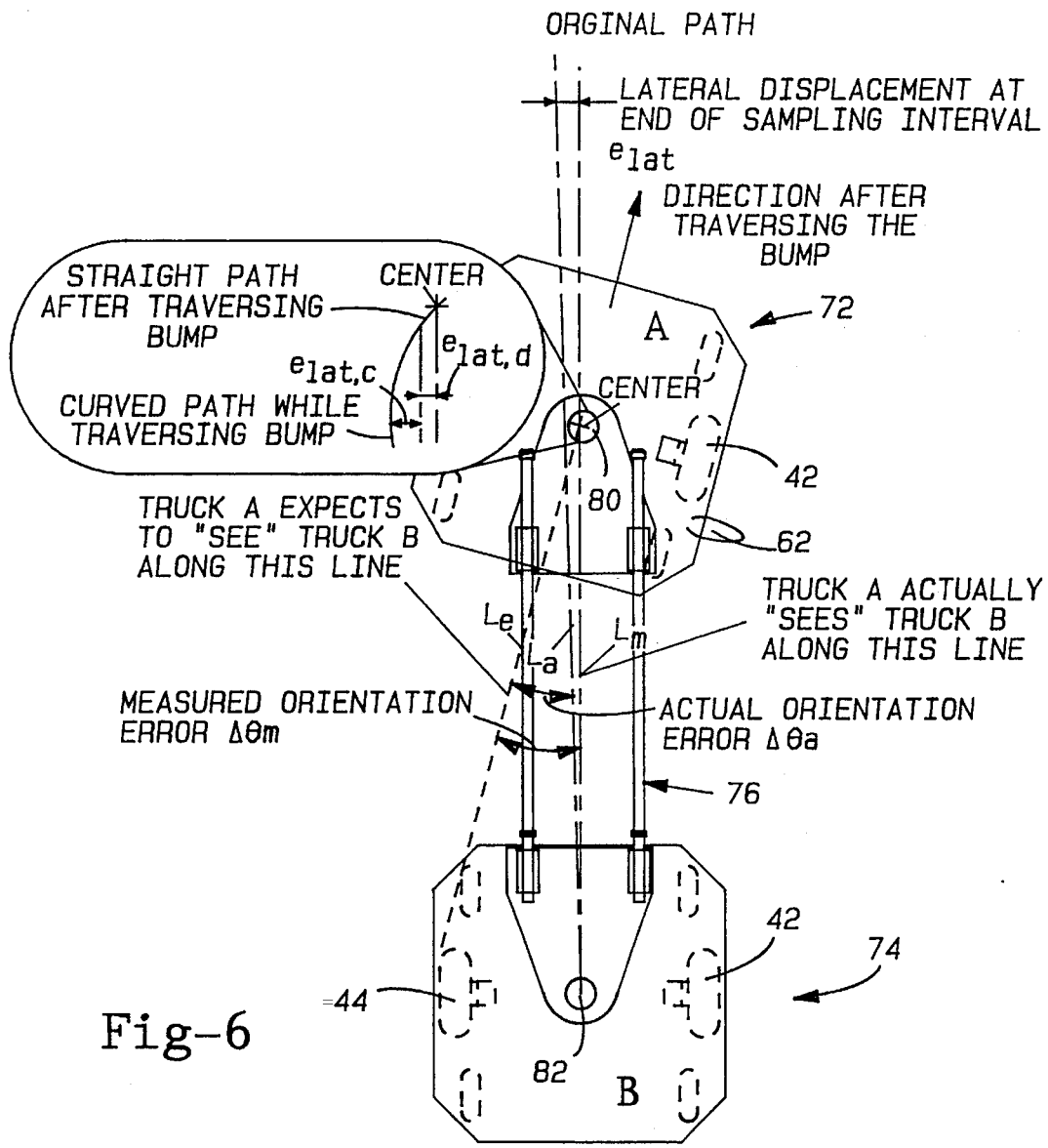
FIG. 6 is a plan view of the mobile robot positioning system shown in FIG. 5 after the lead robot has traversed a bump, showing the resulting change of orientation between the lead and trailing robots.

FIGS. 5 and 6 depict a CLAPPER vehicle both prior to and after traversing a bump with respect to the first robot 72, respectively. As depicted in FIG. 5, both robots 72 and 74 are longitudinally aligned and traveling forward as drive wheel 42 on robot 72 approaches a bump 62. For the sake of numeric example, it is assumed that both robots are traveling at a velocity V=0.5 m/sec., and that the sampling time of the interval encoders is $T_s$=40 ms. Thus, during a single sampling interval both trucks travel a distance $D_s = V \cdot T_s$=20 mm. This bump imparts a typical non-systematic dead-reckoning error to the CLAPPER vehicle. The preceding assumptions will now be used to develop a numeric example which will be used to detail the variations present when implementing the IPEC method on the CLAPPER vehicle.

Figure 7:
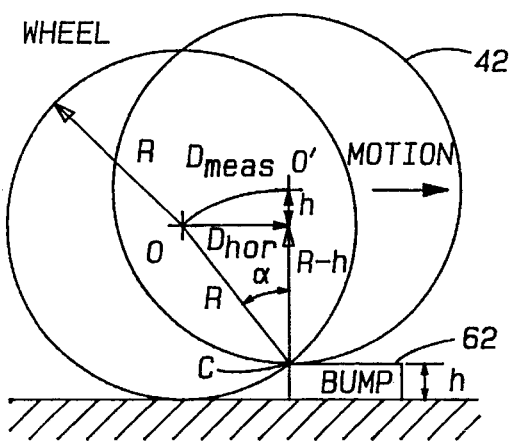
FIG. 7 is an elevational schematic view of a robot encoder wheel utilized in the robot of FIGS. 3–6 showing the wheel traversing a bump.

Next, referring to FIG. 7, we consider the geometry of a wheel 42 of radius R traversing a bump 62 of height H. To simplify, an assumption is made that the wheel is perfectly rigid such that the wheel will traverse the bump by rotating around a contact point C until the wheel's center point O is directly above C (at O'). During this motion the wheel encoder, for example drive motor encoder 48 of wheel 42, measures a rotation α as robot 72 traverses bump 62. Rotation α is interpreted as the linear travel distance $D_{meas}$. However, the actual travel distance in horizontal direction is only $D_{hor}$. This discrepancy creates a linear error $\Delta D = 2 \cdot (D_{meas} - D_{hor})$ which is not depicted in FIG. 7. The quantity "2" is present because the wheel travels up as well as down the bump.

For the case of straight-line motion, a low-level controller on a conventional differential-drive mobile robot will attempt to keep the rotation velocities of both wheels equal. Thus, the horizontal distance traveled by the wheel which traverses the bump, in the case at hand and for wheel 42 on robot 72, will be $\Delta D$ less than that of the left wheel 44, causing a curved motion to the right, which is depicted in FIG. 6 subsequent to robot 72 traversing bump 62.

Application of simple geometric relations to FIG. 7 produces the sample results which are shown in Table I. The physical dimensions noted in Table I correspond to those of the commercially available LabMate robot utilized to implement the present embodiment. These resulting sample numbers will be used in the following discussion.

As was detailed in the preferred embodiment, the most significant error in the CLAPPER vehicle system is the resulting orientation error $\Delta\theta_a$ because it causes an unbounded lateral error, $e_{lat}$, which grows proportionally with distance at a rate of:

$$e_{lat}(D) = D \cdot \Delta D/b = D \sin \Delta\theta_a \quad \text{(Equation 1)}$$

where

D—distance traveled since clearing the bump;
b—wheelbase.

For example, Table 1 shows that the lateral error of robot 72 after only 10 m of travel would be $e_{lat}(D=10 \text{ m}) = 77$ mm.

The discussion of systematic dead-reckoning error which was detailed in the preferred smart encoder trailer embodiment infra is also relative to the CLAPPER vehicle and includes unequal wheel diameters and uncertainty about robot wheelbase for robot 72 and 74. However, these systematic errors are automatically corrected by the IPEC method, along with the non-systematic errors.

Growth-Rate Concept Applied to CLAPPER Vehicle

The Internal Position Error Correction (IPEC) method for mutual correction of dead-reckoning errors between robots 72 and 74 of the CLAPPER vehicle 71 utilizes the growth-rate concept detailed in the previous preferred embodiment. Accurate position corrections are obtained from a "floating reference point", for example, the accompanying mobile robot, in order to obtain accurate position corrections. The growth-rate concept applied to dead-reckoning allows for such accurate correction.

As was already discussed in the previous embodiment, both fast-growing errors and slow-growing errors are present with the CLAPPER vehicle. Again, the non-holonomous vehicle assumption is utilized. As applied to the CLAPPER vehicle, the preceding analysis of fast and slow growing errors is utilized by analogy, where robot 72 is substituted for previous robot 20 and robot 74 is substituted for smart encoder trailer 22. However, bearing and position between the pair of robots is now determined by calculating the spaced apart relation with linear encoder 78 on compliant linkage 76 as well as the relative rotational position of each robot with respect to the linkage through rotary encoders 80 and 82. The following numeric example will be used to show that when traversing a bump with the CLAPPER vehicle, each robot can accurately identify the resulting orientation error by measuring its orientation relative to the other robot, and the lateral position error, as described in the preferred embodiment infra, caused by this same bump is negligible during the same sampling interval.

An enlarged inset in FIG. 6 shows the path of robot 72 while traversing a bump 62. The resulting lateral position error of robot 72 results from two factors: a curved section, denoted $e_{lat,c}$, which is generated by one of the wheels as it traverses the bump, and a straight section, denoted $e_{lat,d}$, which results from the constant directional error after the bump is traversed. $e_{lat,d}$ is easy to compute, because it is proportional to the travel distance D after traversing the bump, and it increases at a constant rate as is shown in equation 1 above. However, the trajectory of robot 72 while traversing the bump is difficult to express mathematically, because the orientation error changes during this transient period and it is a function of the geometry of the bump. Hence, we will show that the lateral position error is negligible. For this purpose it is sufficient to determine a reasonable upper bound for $e_{lat,c}$, denoted $e_{lat,max}$, and then show that $e_{lat,max}$ is negligible. A very conservative upper bound for $e_{lat,c}$ is founded on the assumption that the lateral error developed along a straight line, and that the slope of this line resulted from the largest orientation error during the sampling interval, denoted $\Delta\theta_{s,max}$. For the case of a single bump, the orientation error increases monotonously while traversing the bump. For example, the orientation error may increase while the wheel rolls up a bump, or it may stay constant while the wheel is on top of a bump, but it won't decrease. Thus, for any time in which we are sampling an orientation error, it is certain that it is the largest orientation error since the bump was first encountered (i.e. $\Delta\theta_s = \Delta\theta_{s,max}$). This equivalence holds true even if the bump was not yet cleared at the end of the sampling interval.

With this preceding explanation in hand, the upper bound for the lateral error while traversing a bump is determined as $$e_{lat,max}(D_s) = D_s \sin (\Delta\theta_{s,max}) \quad \text{(Equation 2)}$$

where $D_s$ is the distance traveled during the sampling interval. Recall that $D_s = 20$ mm and $\Delta\theta_s = 0.44°$ from our previous assumptions. Substituting these values into equation 2 yields an upper bound of $e_{lat,max}(D_s) = 0.15$ mm.

Note that the upper bound for the curved segment in equation 2 is exactly equal to the lateral error caused by the straight section (i.e., $e_{lat,max}(D_s s) = e_{lat,d}$). Thus, the maximum lateral error during a sampling interval is always given by equation 2, and it doesn't matter if at the end of the sampling interval the robot was still traversing or had already cleared the bump.

Next, we will show that the lateral error has no significant influence on the accuracy of the relative orientation measurement between the two robots. Given that the CLAPPER maintains a distance of L=1 m between the two robots, one can easily compute from the geometry of FIG. 6 that the maximum lateral error $e_{lat,max}(D_s) = 0.15$ mm will reduce the actual orientation error $\Delta\theta_a = 0.76°$ by $$\epsilon=\sin^{-1}(e_{lat,max}/D_s)=\sin^{-1}(0.15/1000)=0.01°$$

and result in a measured orientation error $$\Delta\theta_m=\Delta\theta_a-\epsilon=0.44°-0.01°=0.43°$$

From the preceding, it is apparent that even the maximum lateral error $e_{lat,max}$ affects the accuracy of the orientation error measurement only by $\epsilon=0.01°$.

The preceding numeric example illustrates the growth-rate concept for dead-reckoning errors as applied to the CLAPPER vehicle: the 10 mm bump in our example causes an appreciable and immediately measurable orientation error of $\Delta\theta_a=0.44°$, while the resulting lateral error $e_{lat}=0.15$ mm remains negligibly small during a reasonably short sampling interval and reduces the accuracy of the orientation measurement by only 0.01°.

Here we have examined the most basic case for a robot 72 encountering a bump while robot 74 retains its heading. However, even for the case where robot 74 encounters a bump during the same sampling interval that robot 72 encounters a bump, its lateral error would be similarly small. Neither this lateral error nor the orientation error of robot 74 would cause a significant error in the orientation measurement of the first robot relative to the second robot, or vice-versa, yet, even in this extreme and rare case, the inaccuracy of the orientation error measurement would be $\epsilon=2\times0.01°=0.02°$, which translates into $0.02/0.44\times100-4.5\%$ inaccuracy in measuring the orientation error of robot 72 relative to robot 74.

IPEC Method Applied to CLAPPER Vehicle

Application of the IPEC method to the CLAPPER vehicle is similar to that utilized in the smart encoder trailer embodiment infra. Referring to FIG. 6, robot 72 is shown oriented in its direction of travel after traversing bump 62. This direction differs from the intended or straight ahead direction resulting from a dead-reckoning error. Robot 72 still "believes" it is traveling straight ahead. Consequently, robot 72 expects that the center of robot 74 is straight behind it, along the dotted line labeled $L_e$. Using dead-reckoning data from both robots, robot 72 can always compute the expected direction to the center of robot 74, whether both robots are traveling straight or along a curved path. This expected direction can then be compared to the measured direction, which is readily available from the absolute rotary encoder 80 on robot 72. The difference between the expected direction and the measured direction is the measured orientation error $\Delta\theta_m$. The orientation error of robot 74 can be determined in a similar way, relative to the center of robot 72.

Correcting Orientation Errors

Heretofore, we explain the actual implementation of the IPEC method on the CLAPPER vehicle. With its three internal encoders, the CLAPPER vehicle performs relative position measurements every $T_s=40$ ms. This sampling rate allows each robot to detect the fast-growing orientation errors caused by bumps. The slow-growing lateral position errors of both robots have no significant effect on this measurement, as was shown in the previous section. Note that the sampling time is not critical for the performance of the system.

The IPEC method performs the following computations once during each sampling interval: At first, robots 72 and 74, denoted hereinafter by "A" and "B", respectively, compute their momentary position and orientation based on dead-reckoning:

$$X_{A,i}=X_{A,i-1}+U_{A,i}\cos\theta_{A,i}$$

$$Y_{A,i}=Y_{A,i-1}+U_{A,i}\sin\theta_{A,i}$$

and (Equation 5)

$$X_{B,i}=X_{B,i-1}+U_{B,i}\cos\theta_{B,i}$$

$$Y_{B,i}=Y_{B,i-1}+U_{B,i}\sin\theta_{B,i}$$

where $X_{A,i},Y_{A,i}$ position of centerpoint of robot A (72), at instant i;

$X_{B,i},Y_{B,i}$ position of centerpoint of robot B (74), at instant i;

$U_{A,i},U_{B,i}$ incremental displacements of the centerpoints of robot A and robot B during the last sampling interval;

$\theta_{A,i},Y_{A,i}$ Orientations of robot A and robot B, respectively; computed from dead-reckoning.

Note that the dead-reckoning equations for $U_i$ and $\theta_i$ are well known and not repeated here. For further clarification, please see Banta, L., 1988, "A Self Tuning Navigation Algorithm", Proceedings of the 1988 IEEE International Conference on Robotics and Automation, Philadelphia, April 25, pp. 1313–1314, as well as Crowley, J. L., 1989, "Asynchronous Control of Orientation and Displacement in a Robot Vehicle", Proceedings of the 1989 IEEE International Conference on Robotics and Automation. Scottsdale, Ariz., May 14–19, pp. 1277–1282, which are hereinafter incorporated by reference, Also note that we will skip the index i in the following equations.

Next, the orientation $\theta_L$ of the compliant linkage is computed $$\theta_L = a\tan\frac{Y_B-Y_A}{X_B-X_A}$$

Figure 8:
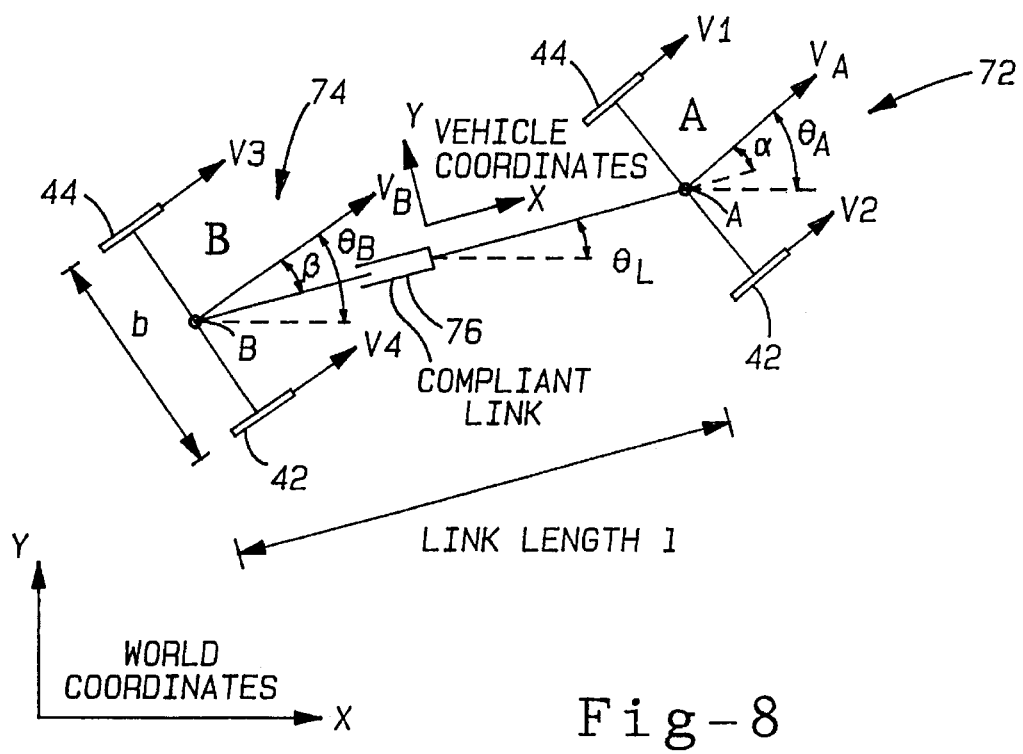
FIG. 8 is a schematic diagram of the robot positioning system of FIGS. 3–6 showing kinematic components.

Using the kinematic relations defined in FIG. 8, we can now compute the expected angles $\alpha_{exp}$ and $\beta_{exp}$ between the compliant linkage and robots A and B respectively.

$$\alpha_{exp}=\theta_A-\theta_L \qquad \text{(equation 6a)}$$

and $$\beta_{exp}=\theta_B-\theta_L \qquad \text{(equation 6b)}$$

Note that the index "exp" stands for "expected," indicating that the computed angle is expected, based on dead-reckoning during this sampling interval.

We can now compute $$\Delta\theta_A=\alpha_{act}-\alpha_{exp} \qquad \text{(equation 7a)}$$

and $$\Delta\theta_B=\beta_{act}-\beta_{exp} \qquad \text{(equation 7b)}$$

where $\alpha_{act}$ and $\beta_{act}$ are the actual angles between the compliant linkage and robots A and B respectively, as measured by the two absolute rotary encoders 80 and 82 located at the center of each robot (see FIGS. 4 and 8). Non-zero results for $\Delta\theta_A$ or $\Delta\theta_B$ do not only indicate the presence of a dead-reckoning error, but they are quantitatively accurate values for correcting these errors. Thus, computing $$\theta'_A=\theta_A+\Delta\theta_A \qquad \text{(equation 8a)}$$

and $$\theta'_B=\theta_B+\Delta\theta_B \qquad \text{(equation 8b)}$$

yields the corrected orientations for robot A (72) and robot B (74).

Correcting Translation Errors

The IPEC method can detect only rotational errors, but not translational errors. However, rotational errors are much more severe than translational errors, because orientation errors cause unbounded growth of lateral position errors. This observation was illustrated in Table I, where the translational error resulting from traversing a bump of height 10 mm was $\Delta\theta=2.63$ mm. By comparison, the lateral error due to the rotational error $\Delta\theta$ was $e_{lat}=77$ mm after only 10 m of travel.

We can further distinguish two kinds of translational errors: pure and composite. Pure translational errors occur when both wheels traverse bumps of similar height during the same sampling interval. These errors cannot be detected with the IPEC method, but they are rare in practice and they produce only small and finite position errors. Composite translational errors occur when only one wheel traverses a bump, thereby causing a translational and a rotational error. Since we can detect the rotational error, we can also correct for the translational part, as discussed next.

Since composite translational dead-reckoning errors are the result of a rotation (the magnitude of which is known from Equations 7), it is possible to correct the translation error once we know the point around which the rotation took place.

Banta, incorporated by reference supra, helps solve this problem by explaining that a non-systematic orientation error is practically always caused by an encoder reporting a horizontal distance that is longer than the distance the wheel had actually traveled. This is true for all kinds of floor irregularities, whether they are bumps, cracks, or fluid spills. Because of this important insight we can safely assume that the dead-reckoning orientation error of $\Delta\theta_a=0.44°$ (in our example) is not caused by the left wheel that has progressed more than reported by the encoder—rather, it is the right wheel that has lagged behind in its horizontal progression although the (false) encoder readings make the robot believe both wheels had progressed the same horizontal distance. We can thus correct the internal position representation of robot 72 by applying the corrective rotation $\Delta\theta_A$ around the contact point of the left wheel, so that the position of the centerpoint A is corrected backward (see FIG. 9) by $$\Delta D = b \sin(½\Delta\theta_A) \quad \text{(equation 9)}$$

or $$X'_A = X_A - b \sin(½\Delta\theta_A) \cos(\theta_A) \quad \text{(equation 10)}$$

$$Y'_A = Y_A - b \sin(½\Delta\theta_A) \sin(\theta_A)$$

In actual experimentation we found that this correction of the translational error has only minimal effect on the overall accuracy of the system. By contrast, the position correction for robot 74 is of crucial importance, and it must be done in a different manner and for different reasons, as explained next.

It is clear at this time that the IPEC method does not eliminate dead-reckoning errors completely. Thus, after some travel time both robots will have accumulated a certain position error. Yet, even the smallest position error of either truck will affect the computation of the orientation $\theta_L$ of the compliant linkage. Such an error in $\theta_L$, in turn, would affect Equations 6, causing the system to "see" and correct non-existing dead-reckoning errors all the time. To avoid this problem, we have to correct the position of one robot relative to the other after every sampling interval. In our case, we correct the position of robot B (74) according to $$X'_B = X_A - l \cos\theta_L \quad \text{(equation 11)}$$

$$Y'_B = Y_A - l \sin\theta_L$$

where $X'_B$, $Y'_B$ are the corrected coordinates of robot B, and l is the length of the compliant linkage, as measured by the linear encoder onboard the CLAPPER.

The effect of this correction is that the position of robot B is not at all computed by summing-up dead-reckoning increments. Rather, robot B's dead-reckoning is relevant only for the distance traveled during one sampling interval, while its accumulated position is always computed relative to robot A (72). This measure is perfectly legitimate because the position of robot B relative to robot A can always be computed from the three internal encoders. The single disadvantage is the need to measure the distance between the robots (l) quite accurately, to avoid systematic errors during turning as will be explained below.

Correction of Systematic Dead-Reckoning Errors in CLAPPER Vehicle

In the previous section we explained the IPEC method relative to non-systematic errors. An additional source of dead-reckoning errors is known as "systematic errors" which were previously discussed in the preferred smart encoder trailer embodiment above. As was noted, systematic errors are usually caused by imperfections in the design and mechanical implementation of a mobile robot. In the CLAPPER vehicle, there are now two robots which can introduce systematic errors. As was noted, systematic errors are particularly grave because they accumulate constantly.

As was noted in the preferred embodiment, the IPEC method corrects both non-systematic errors as well as systematic errors, provided the systematic error causes a dead-reckoning error in the vehicle orientation. For example, consider the CLAPPER vehicle programmed to move straight ahead. Unequal wheel diameters on robot 72 will cause the robot to follow a curved path, instead. Even though the resulting rate of rotation is very small, the CLAPPER will trigger a correction as soon as the accumulated orientation error exceeds the resolution of the absolute encoder (which is 0.3° in the experimental laboratory CLAPPER which the inventor has constructed). In the inventor's experiments it was found that the CLAPPER can easily accommodate and correct large systematic errors. Indeed, the inventor has implemented a calibration procedure in which certain systematic errors (like unequal wheel-diameters) are automatically calibrated by monitoring the corrective actions of the CLAPPER while traveling on smooth surfaces. The calibration procedure is detailed below. Similarly, the error resulting from the uncertainty about the effective wheelbase of the robot can be corrected with the IPEC method.

Although the CLAPPER vehicle corrects most systematic errors found on conventional mobile robots, the CLAPPER vehicle introduces new unconventional systematic errors that are specific to this vehicle. These unconventional systematic errors involve biased measurements of the absolute rotary encoders 80 and 82, and biased measurements of link-length l of linkage 76 due to linear encoder 78. Consider, for example, the situation in which the CLAPPER is programmed to move straight ahead. The onboard controller will comply with this task by controlling both robots such that both absolute encoders don't deviate from $\alpha=\beta=0°$. Now suppose that because of inaccurate assembly of the vehicle, encoder 80 reads 0° while robot 72 is actually rotated, say, +1° relative to the compliant linkage. Suppose further encoder 82 showed 0° while robot 74 was actually rotated −1° relative to the compliant linkage. The resultant path would be curved to the left instead of straight. This condition cannot be detected by the IPEC method and its effect is similar to that of unequal wheel diameters in conventional mobile robots.

Another unconventional systematic error is related to the biased measurement of the linear encoder. Even though the resolution of this encoder in our prototype vehicle is 0.1 mm, we suspect a constant bias on the order of 2 mm and, in addition, a problem with eccentricity which changes the bias when the two trucks rotate relative to the compliant linkage. This link-length bias will cause a slight inaccuracy in the correction of the rear-robot position, because equations 11 depend on the link length l. During straight line travel, the link-length bias has no effect on the overall accuracy of the system. However, during turning movements any small inaccuracy in the position of the rear truck will cause a small error in computing the orientation of the compliant linkage, $\theta_L$, because of equation 5. Such an error will be interpreted by the CLAPPER as a dead-reckoning error during the next sampling interval, because of equations 7. Consequently the CLAPPER will "correct" this perceived dead-reckoning error. In informal experiments we found that a constant bias of 1 mm in the measurement of the link-length l causes an orientation error of roughly 1° for every full 360° turn of the CLAPPER.

So far we have seen that the CLAPPER corrects most conventional systematic errors, while introducing some new, unconventional systematic errors of its own. We argue that the unconventional errors are less of a problem, for the following reasons:

a. The most severe conventional systematic errors depend to a large degree on circumstances that can not be controlled by the robot's manufacturer. For example, unequal wheel-diameters are often the result of different loading characteristics of the vehicle. By contrast, the unconventional systematic errors of the CLAPPER depend on fixed manufacturing characteristics of the vehicle. Being aware of the importance of reducing measurement bias, the manufacturer of a CLAPPER-type vehicle can design and build the vehicle with tight tolerances for the assembly of the encoders.

appears to be good for two reasons: 1) the method converged to similar values from different false initial diameters; and 2) the accuracy with the calibrated wheel diameter as the initial value was excellent.

The experiment was run as follows: The nominal wheel diameter for the LabMate robot is $D_n$=15 cm. Severe systematic dead-reckoning errors cure when the left and right wheel diameters are not equal, because the robot will travel on a curved path instead of a straight one when both wheels are turned the same amount. The ratio c between the actual wheel diameters determines the amount of the errors. In the LabMate a ratio of c=0.99 or c=1.01 (corresponding to a discrepancy of ±1% between the two wheel diameters) can cause errors of over 8° in orientation and 70 cm in lateral displacement after only 10 meters of travel.

To minimize these errors, end-users may try to introduce a calibration ratio $c=D_L/D_R$ that multiples the encoder reading of, say, the left wheel encoder. For example, if the left wheel encoder produces 100 pulses in a sampling interval, then the onboard computer receives the calibrated information that the 100×c pulses were produced. If c is "just right", it can perfectly compensate for the discrepancy between actual wheel diameters. In practice, however, it is not easy to find c. Typically, the end-user must run numerous experiments with different guesses for c and then choosing the one that yielded the best accuracy for a given test path. The resulting calibration value will be good only as long as there is no substantial change in the load distribution on the robot.

By contrast, with the automatic procedure made possible by IPEC, one single run through the 4 m×4 m square-path automatically yields good calibration values. Note that there are two calibration values, $c_F$ and $c_R$ for the front and rear robot, respectively. Table 2 below shows results of four different experiments, each run with a different set of initial values for $c_F$ and $c_R$. Note how our method converges to similar calibrated values even though the initial value were quite different.

TABLE 2

| run # | Initial calibration factor for front truck | Initial calibration factor for rear truck | Converged calibration factor for front truck | Converged calibration factor for rear truck |
|---|---|---|---|---|
| 1 | 0.995 | 0.995 | 0.9983 | 0.9969 |
| 2 | 0.995 | 1 | 0.9986 | 0.9968 |
| 3 | 1 | 0.995 | 0.9981 | 0.9963 |
| 4 | 1 | 1 | 0.9984 | 0.9969 | b. The measurement bias of the encoders in the CLAPPER (which causes the unconventional systematic errors) can be detected and corrected by means of simple calibration procedures. Once these procedures have been performed, the resulting calibration parameters remain basically valid under all operating conditions, independent of floor or load characteristics.

Experimental Verification of Automatic Calibration Procedure for Systemic Errors The calibration procedure discussed supra was implemented successfully on the CLAPPER embodiment. To validate the calibration procedure, experiments were run in which the robot was intentionally programmed with false information about the actual wheel diameters of the CLAPPER. After running the robot around on a smooth floor, the calibration procedure would converge to a calibrated value for the wheel diameter. The resulting calibrated value The automatic calibration is implemented simply by computing:

$$c_i = c_{i-1} + K\Delta\theta_i$$

where $C_{i-1}$ Calibration factor from previous sampling interval $C_i$ New calibration factor k gain $\Delta\theta_i$ measurement error as found in equations 7 (in patent application)

Experimental Results of CLAPPER Vehicle Performance

In order to evaluate the performance of the CLAPPER vehicle while implementing the IPEC method of this invention, we conducted several sets of representative laboratory experiments which are depicted in FIGS. 10–12. In this section we report results from these repeatable, basic experiments which were performed inside a laboratory, and include a straight line experiment shown in FIG. 10, and a rectangular path experiment shown in FIGS. 11 and 12.

A. Straight Line Experiment

All indoor experiments were conducted on fairly smooth concrete floors. We produced controlled irregularities by placing a piece of 10 mm diameter cable under one side of the vehicle. We will refer to this irregularity as a "bump". All experiments started and ended near an L-shaped reference corner. Three ultrasonic sensors were mounted on the CLAPPER, two sensors were facing the long side of the L-shaped corner, the third sensor faced the short side. The ultrasonic sensor system allowed measurement of the absolute position of the vehicle to within ±2 mm in the x and y directions, and to about ±0.25° in orientation.

At the beginning of each run a sonar measurement was taken to determine the starting position of the vehicle. The CLAPPER then traveled through the programmed path and returned to the L-shaped corner, where the perceived position (i.e., the position the vehicle "thought" it was, based on dead-reckoning) was recorded. Then, a sonar measurement was taken to determine the absolute position. The difference between the absolute position and the perceived position is called the return position error. The average speed in all runs was slightly below 0.5 m/sec.

B. Rectangular Path Experiment

In this experiment the CLAPPER was programmed to pass-by the corners of a 7×4 m rectangular path with smooth 90° turns at the corners and a total travel length of approximately 24 m (see FIG. 11 ). To provide fluid, uninterrupted motion, the programmed path did not require the vehicle to stop at the intermediate points; passing-by at a distance of less than 0.2 m was sufficient. In order to measure the position errors after completing the path, the vehicle began and ended each run in the L-shaped "home" corner, as shown in FIGS. 11a and b.

When testing dead-reckoning errors in closed-path experiments, it is imperative to run the experiment in both clockwise (cw) and counter-clockwise (ccw) directions. If tests are run in only one direction (for example, to calibrate parameters that determine the effective wheel base or compensate for different wheel-diameters), then systematic dead-reckoning errors can mutually compensate for each other. This way, an experimenter might carefully calibrate two parameters to yield excellent accuracy for a particular test-path, yet the calibrated parameters are quite wrong. If, however, the test is performed in both cw and ccw direction, then mutual compensation in one direction increases the resulting error when run in the other direction. Thus, if a mobile robot performs a closed test path accurately in both directions, one can be assured that the vehicle is well calibrated.

FIG. 12 shows the return position errors for the Rectangular Path Experiment under different test conditions. The CLAPPER ran through the path for 10 runs in cw, and 10 runs in ccw direction. In each of these runs the CLAPPER had to traverse 10 bumps. In one half of the runs bumps were located under the right-side wheels of both trucks, and in the other half of the runs under the left-side. The return position errors of these runs are marked by small squares (see Legend in FIG. 12). None of the 20 runs produced an error of more than 5 cm. Also shown in FIG. 10 are the results of five cw and five ccw runs with IPEC but without bumps (marked by small circles). Note that the results with bumps are almost indistinguishable from the results without bumps. In a further experiment the vehicle ran through the path with bumps, while the IPEC function was disabled (i.e., using normal dead-reckoning like conventional mobile robots). The results of these runs are marked by stars in FIG. 12. Also noted in the inset table in FIG. 12 are the resulting average absolute orientation errors of these runs, defined as $$\epsilon_{\theta,avrg} = \frac{1}{n} \sum_{i=1}^{n} |\epsilon_{\theta,i}|$$

One might recall that for longer distances the orientation errors cause the lateral position errors to grow without bound. The results in FIG. 12 show that the IPEC method resulted in a more than 20-fold reduction in orientation errors. Indeed, in longer paths with more disturbances one should expect even better improvements, because the average absolute orientation error of $\epsilon_{\theta,avrg}=0.3°$ is just about equal to the accuracy with which we are able to measure the actual position of the CLAPPER with the three onboard ultrasonic sensors.

These experimental results compare well with experimental results obtained by the author in earlier work with the same MDOF vehicle but without IPEC. In those experiments the average translational error in 10 runs along a 16 m rectangular path was $\epsilon_{max}=5.6$ cm and the average absolute orientation error was approximately 0.7°. These earlier experiments, of course, were conducted on smooth floors with a well calibrated vehicle. The improvement evident in the results of FIG. 12 over the earlier, non-IPEC results on smooth floors can be accredited to the ability of the IPEC method to correct conventional systematic errors. These results further indicate that careful calibration of the non-conventional system parameters in the CLAPPER is more effective than the equally careful calibration of conventional system parameters in conventional vehicles.

SECOND ALTERNATIVE EMBODIMENT: TWIN VEHICLE INTEGRATED NAVIGATION SYSTEM (TVINS)

Figure 14:
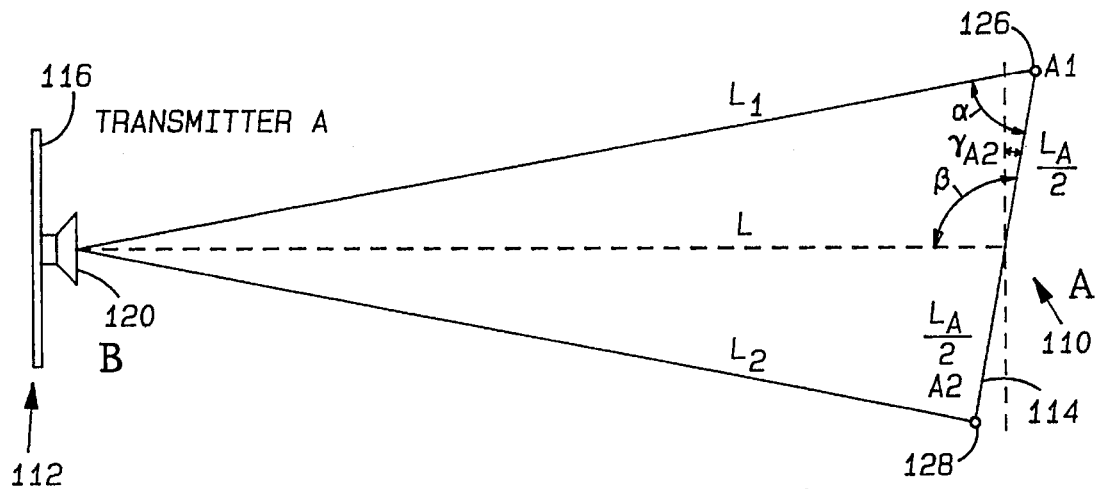
FIG. 14 is a schematic diagram of the mobile robot positioning system of FIG. 13 depicting the geometric relations for calculating distance and bearing.

A second alternative embodiment of the invention is depicted in FIGS. 13–15 where a pair of autonomous robotic vehicles each with a transmitter and receiver array, collaborate to perform the IPEC method of the preceding embodiments. Preferably, a pair of LabMate robots identical to those used to construct the CLAPPER vehicle of the preceding embodiment are used to construct the present embodiment. Each of the robots 110 and 112, hereinafter denoted A and B, respectively, have an identical corresponding body 24 and chassis 26 with four spaced apart caster wheels 34 through 40 and a pair of encoder drive wheels 42 and 44 spaced apart laterally, each with a rubber tire 46 and a drive motor with a shaft encoder 48. However, each robot now has a rotating antenna sensor arm 114 and 116, respectively, which is pivotally carried about a central pivot 118 and 120, respectively, in the center and on top of each robot body. A transmitter 122 and 124 is provided on each robot arm 114 and 116, respectively, coincident with the axis vertically through each central pivot. Hence, as each sensor arm rotates, the relative position of each transmitter with respect to each robot remains generally the same with respect to the central pivot. Spaced apart on each sensing arm from the respective transmitter are a pair of receivers 126, 128 and 130, 132 on arms 114 and 116, respectively. Each receiver is spaced apart from each respective transmitter a known distance such that a rotary encoder 134 and 136 measures the rotation, or bearing of each sensor arm with respect to each robot which allows for accurate relative positional orientation of each pair of receivers on one robot with respect to the transmitter on the other robot. Relative positioning of robot 110 can be determined with its receivers 126 and 128 communicating with transmitter 124 on robot 112. Cooperation of the transmitters and receivers on the pair of robots provides a Twin Vehicle Integrated Navigation System (TVINS) having an Onboard Relative Positioning System (ORPS) comprising the rotating sensor arms, receivers, transmitters, and rotary encoders.

Detailed description of the CLAPPER vehicle system for reducing non-systematic dead-reckoning errors, as well as systematic errors are applicable in this embodiment. The only difference is the substitution of the ORPS for the compliant linkage with the three internal encoders. Following is a description of how the ORPS operates when performing internal position error correction on the TVINS vehicle. Likewise, orientation errors are detected on the TVINS vehicle in a manner analogous to that for the CLAPPER vehicle, where an actual orientation error and measured orientation error are compared, and lateral error $e_{lat}$ is determined to be negligible and is ignored. Likewise, details of unbounded growth of lateral position errors follow from the preceding embodiment as to discussions of pure and composite translational errors. The TVINS vehicle corrects non-systematic orientation errors by utilizing onboard computers which maintain an internal position representation which is constantly updated by dead-reckoning based on the wheel encoders of the robots. The antenna, or ORPS array, detects dead-reckoning errors of one vehicle with respect to another and the dead-reckoning error is immediately corrected. Likewise, translational dead-reckoning errors are corrected in the case where they can be positively defined at a position around which the corrective rotation of the internal position representation should take place. Likewise, as previously discussed, Banta (1988) helps solve this problem by explaining that a non-systematic orientation error is practically always caused by an encoder reporting a longer horizontal distance than what the wheel had actually traveled. Furthermore, it is worth noting that orientation errors do not accumulate, with respect to the preceding analysis of curved path and straight path in the preceding error correction model.

For example, referring to the previously detailed Table I in the preceding two embodiments, a bump with the initial error conditions depicted in Table I with the assumptions of a measurement resolution of 0.2° gives an ORPS which reports an error of 0.6° (instead of the actual error which is 0.76°) and the onboard computer would correct the internal position representation accordingly. During subsequent motion, robot 110 can correct its heading according to the corrected internal position representation, but the corrected heading would still be off the original direction by the residual error of 0.16°. Now, suppose a second bump is encountered, say, of exactly the same height as the first one. This second bump would again cause an orientation error of 0.76°, which would add to the residual error of 0.16° resulting in a total orientation error of 0.92°. The ORPS would measure this error as 0.8°, leaving a residual error of 0.12°.

As is clear from the example above, the total orientation error of each robot in the TVINS vehicle is bounded by the resolution of the ORPS antenna array. This is a major advantage when compared to conventional dead-reckoning, where orientation errors can and, in practice do accumulate.

As was the case with the preceding embodiments, implementation of the IPEC method on the TVINS vehicle also reduces systematic dead-reckoning errors.

The Onboard Relative Positioning System (ORPS) is critical for the performance of the proposed TVINS. For this reason, and to show the feasibility of our overall approach, we describe one possible implementation in detail. The purpose of the ORPS is to provide accurate measurements of relative distance and bearing between the two robots. The system will be designed such as to measure the relative distance between the robots with an accuracy of better than ±5 mm, and the relative bearing with an accuracy of better than ±0.2°.

Principle of Operation: The Onboard Relative Positioning System (ORPS)

The proposed ORPS will comprise of two identical subsystems, $ORPS_A$ and $ORPS_B$. FIG. 4 highlights $ORPS_A$, which comprises one ultrasonic transmitter A, mounted on a Rotating Sensor Arm (RSA) on robot B (112) (denoted $RSA_B$), and two receivers A1 and A2 mounted on $RSA_A$ on robot A (110). During motion, the onboard computers rotate the RSAs as necessary so that the transmitters and receivers face each other approximately. However, there is no need for great accuracy: The aiming RSA must only be accurate enough to allow the 30° sonar emission cone of the transmitter on the RSA to "paint" both receivers on the other RSA. Rotary encoders measure the angles of the RSAs relative to the vehicles on which they are mounted. The bearing $\gamma_A$ of robot 110 relative to robot 112 is thus defined as the momentary angle $\gamma Y_{A1}$ of $RSA_A$ relative to the forward direction of twin A plus the angle $\gamma Y_{A2}$ between the normal N through the center of $RSA_A$ and the direct "line-of-sight" L between the centers of the two RSAs (see FIG. 4).

The proposed system functions as follows (here explained for $ORPS_A$): Once every sampling interval, Transmitter A fires a short burst of ultrasound (for example, 16 pulses at 50 KHz). The receivers A1 and A2 are synchronously triggered, for example by means of radio signals or infrared pulses, and measure the time-of-flight of the signal transmitted. Knowing the speed of ultrasound in air, the distances $L_1$ and $L_2$ can be computed.

A simple thresholded receiver circuit is used with ORPS such as the one used in the popular POLAROID™ sensors available from POLAROID Corporation, 1993, Ultrasonic Components Group, 119 Windsor Street, Cambridge, Mass. 02139. This threshold receiver integrates the amplitude of the received signal over time and registers the time-of-flight once the integral value exceeds a certain threshold. This method is considered somewhat inaccurate as shown by Barshan and Kuc, 1992, "Active Sonar For Obstacle Localization Using Envelope Shape Information", Proceedings of the 1991 IEEE Int. Conf. on Acoust. Speech Signal Processing. Toronto Ontario, Canada, May 14–17, pp. 1273–1276, because the triggering does not occur at the very beginning of the first received pulse. For very weak signals, several pulses must be received before the integrator reaches the threshold. This can result in measurement errors $\Delta L_1$ and $\Delta L_2$ on the order of several millimeters. In typical echo-based ultrasound systems the strength of the signal varies not only with distance but also with reflective properties of the reflecting surface. In our proposed system the error is expected to be less grave, because we use a direct transmitter-receiver system which doesn't rely on reflections from objects. Also, in the TVINS application the distances between transmitter and receiver are always relatively short (1–4 m), which helps provide strong signals. Furthermore, for our approach outlined above, we are mostly interested in the relative bearing between the twins, and less in the relative distance. As is obvious from the geometry of the problem (see FIG. 14), the computation of the relative bearing (which is found from $\gamma_2$) depends largely on the difference between the measured distances $L_1$ and $L_2$. The difference, however, is not significantly affected by measurement inaccuracies, because both receivers receive approximately the same signal strength (since they are both approximately facing the transmitter). For this reason it is currently our assumption that a simple thresholded receiver circuit can provide sufficient accuracy for the ORPS. Our own general experimental observations, as well as results from McGillem and Rappaport, T. S., 1989, "A Beacon Navigation Method for Autonomous Vehicles." IEEE Transactions on Vehicular Technology, Vol. 38, No. 3, pp. 132–139, support this assumption. If greater accuracy is needed:

1. analyze the analog signal wave form, using an parabolic curve fit estimator as described in Barshan and Kuc, 1992 as noted supra.
2. apply phase comparison as described in Figueroa and Barbieri, 1991, "An Ultrasonic Ranging System for Structural Vibration Measurements." IEEE Transactions on Instrumentation and Measurement" Vol. 40, NO. 4, August, pp 764–769.

Theoretically, either one of these two measures can reduce the difference of the errors $|\Delta L_1|-|\Delta L_2|$ to the order of $\pm 0.1$ mm.

Mathematical Solution

We wish to show a straight-forward, closed solution for finding the relative distance L and the relative bearing $\gamma_A = \gamma_{A2} + \gamma_{A1}$. Since $\gamma_{A1}$ (the relative angle between $RSA_A$ and the forward direction of robot A) is readily available from the encoder of $RSA_A$, we will only have to find $\gamma_{A2}$.

Referring to the geometry of the problem in FIG. 14, we apply the law of cosines repeatedly. Given the measured distances $L_1$ and $L_2$, as well as the fixed distance between the receivers, $L_A$, we find $$\cos\alpha = \frac{L_A^2 + L_1^2 - L_2^2}{2L_A L_1}$$

Applying the law of cosines again, we find L from $$L^2 = (L_A/2)^2 + L^2_1 - L_A L_1 \cos\alpha$$

we apply the law of cosines once more, to compute $\beta$ from $$\cos\beta = \frac{(L_A/2)^2 + L^2 - L_1^2}{2(L_A/2)L}$$

We can now compute $\gamma_{A2} = \gamma - 90°$.

Simulation Results for TVINS Vehicle Traversing Floor Irregularities

Figure 15A:
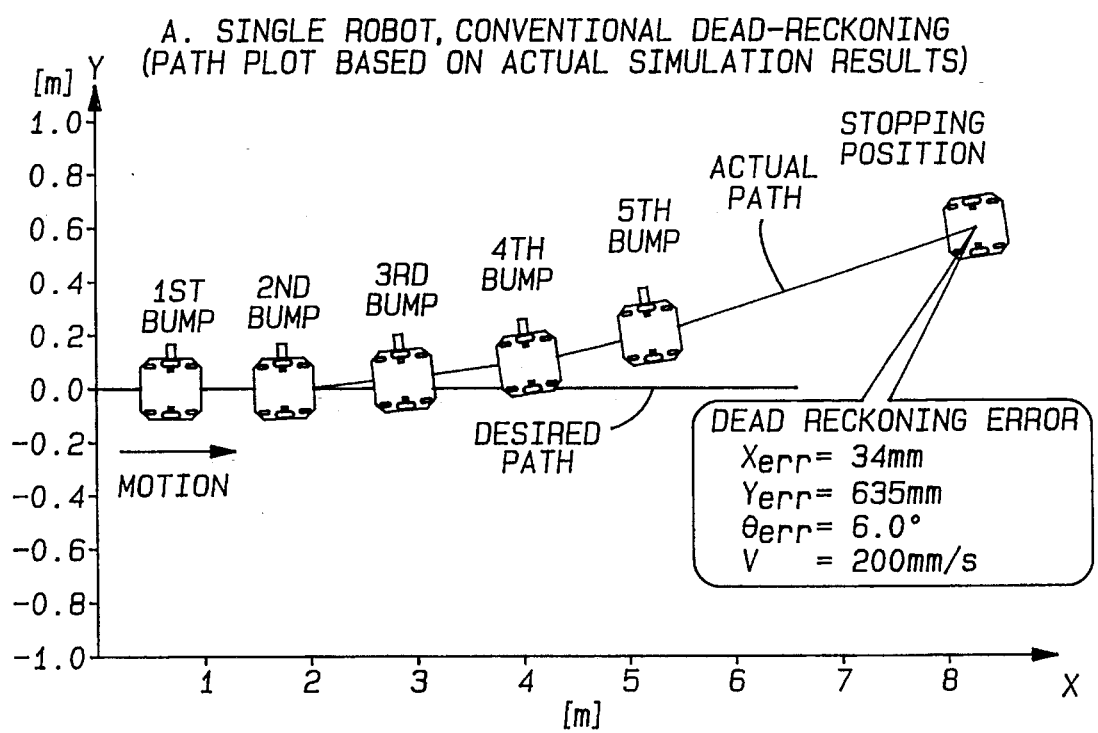
FIG. 15A is a path plot for a single robot with a conventional dead-reckoning system showing path deviation resulting from hitting a series of five bumps based on simulation results.
Figure 15B:
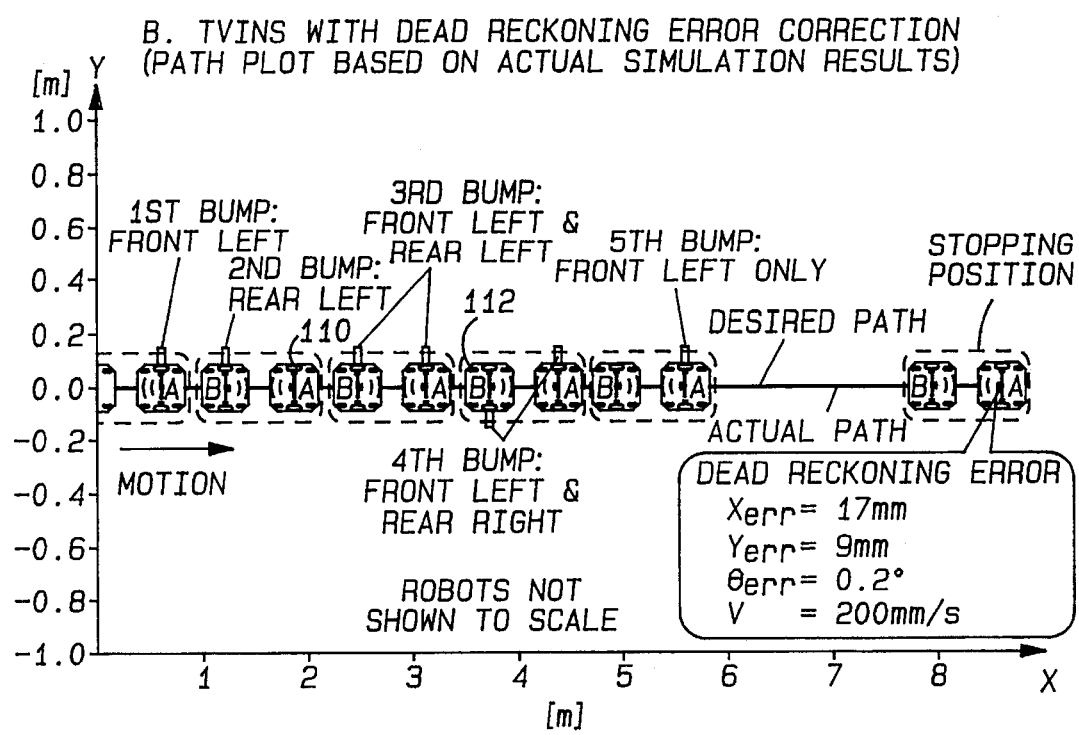
FIG. 15B is a path plot for a pair of decoupled robotic vehicles with the dead-reckoning error correction system of this invention showing path deviation resulting from hitting a series of five bumps based on simulation results.

FIG. 15a depicts results of dead-reckoning error for a single robot with a conventional dead-reckoning system, and FIG. 15b depicts results for TVINS vehicle with dead-reckoning error correction as described supra. The conventional robot is a differential-drive mobile robot. These results are simulated and were calculated by utilizing the preceding equations to calculate values of a simulated run to show accumulation of dead-reckoning error resulting from a series of bumps which induce dead-reckoning error.

The case of a conventional differential-drive mobile robot is shown in FIG. 15a. In this particular run, the simulated robot was programmed to move straight in the positive X-direction. During this run the left wheel traversed five bumps of equal height and about 1 m apart from each other. In the absence of other disturbances, each bump contributed to an orientation error of approximately 1.2°. After only 8 m travel, the lateral error from the desired path is $\gamma_{err} = 635$ mm, as shown in FIG. 15a. This error is destined to grow rapidly with further travel, because of the large orientation error of $\theta_{err} = 6.0°$.

FIG. 15b shows the simulated path of our proposed TVINS. Like in the case of the single robot described above, both twin robots (labeled A and B) were programmed to move straight in the direction of the positive x axis. In addition, the distance between the vehicles was monitored and kept constant by controlling the velocities of both vehicles. This function can easily be implemented with the help of the proposed ORPS. It was also assumed that we could measure angles $\gamma_A$ and $\Delta_B$ with an accuracy of $\pm 0.2°$, as discussed infra. During the run, robot 110 (A) measured its relative bearing to robot 112 (B) and corrected its position. The resulting path shows a substantial improvement in accuracy. Both the orientation error and the lateral error are about thirty to fifty times smaller than the conventional, uncorrected dead-reckoning error. As expected and discussed infra, the reduction of the translational error $X_{err}$ is less substantial. However, this error is much smaller than $\Delta_{err}$ and it doesn't grow with distance.

We made sure in the simulation run that different cases were tested. For example, the run in FIG. 16b includes four different constellations among the five "incidences".

1st bump: A single bump is encountered by the left wheel of robot A.

2nd bump: A single bump is encountered by the left wheel of robot B.

3rd bump: Bumps are encountered by the left wheels of robot A and robot B.

4th bump: Bumps are encountered by the left wheel of robot A and the right wheel of robot B, simultaneously.

5th bump: Same as 1st bump.

In the simulations, all of these incidences were detected and corrected by the TVINS. In additional runs where only single incidences were tested, we found that those incidences that affected both robots simultaneously caused slightly larger translational errors, as expected. Yet another finding from additional runs was that the orientation error appeared bounded to within $\pm 0.2°$, regardless of the length of the run. Also, all results reported in this Section were obtained repeatedly while applying different bumps and traveling on different paths.

It is to be understood that the invention is not limited to the exact construction illustrated and described above, but that various changes and modifications may be made without departing from the spirit and scope of the invention as defined in the following claims.

I claim:

1. A mobile robot positioning system for performing internal correction of dead-reckoning errors comprising:
   a first mobile robotic vehicle;
   a second mobile robotic vehicle spaced apart from said first vehicle;
   a relative positioning system for ascertaining relative bearing between said first and second vehicles;
   a dead-reckoning system for ascertaining position and bearing of said first vehicle relative to a last known position;
   error discriminating means for detecting and correcting systematic and non-systematic dead-reckoning errors of said first vehicle by comparing said ascertained relative bearing between said first and second vehicles from said relative positioning system with an ascertained position and bearing from said dead-reckoning system;
   wherein said first and second vehicles travel in spaced apart relation while collaborating via said relative positioning system to measure the bearing of said first vehicle with respect to said second vehicle to obtain relative position information for correcting dead-reckoning errors of said robot positioning system.

2. The mobile robot positioning system of claim 1 wherein said second mobile robotic vehicle is a passively towed robotic vehicle trailer having a rotatable coupling with a rotary encoder which is coupled to said first mobile robotic vehicle such that said second vehicle is trailed behind said first vehicle with said vehicles collaborating via said relative positioning system to correct dead-reckoning errors.

3. The mobile robot positioning system of claim 2 wherein said robotic vehicle trailer has a pair of spaced apart rotary encoder wheels on said trailer to provide input to said dead-reckoning system.

4. The mobile robot positioning system of claim 1 wherein said first mobile robotic vehicle is a mobile robot with a plurality of rotary encoder wheels carried in spaced apart relation which provide input to said dead-reckoning system.

5. The mobile robot positioning system of claim 1 wherein said first mobile robotic vehicle is an agricultural vehicle adapted with a plurality of rotary encoders carried in spaced apart relation which provide input to said dead-reckoning system.

6. The mobile robot positioning system of claim 1 wherein said first mobile robotic vehicle is a self-guided vehicle having a plurality of spaced apart rotary encoders which provide input to said dead-reckoning system.

7. The mobile robot positioning system of claim 1 wherein said relative positioning system is a rotatably and axially compliant linkage fixed between said first and second vehicles for sensing relative bearing between said vehicles, said linkage being movable between extended and retracted positions.

8. The mobile robot positioning system of claim 1 wherein said first mobile robotic vehicle is a first end of an automobile and said second mobile robotic vehicle is a second end of said automobile and said relative positioning system further comprises a rotatable coupling with a rotary encoder which couples said first end to said second end such that said second end is trailed behind said first end with said pair of ends collaborating via said relative positioning system to correct dead-reckoning errors.

9. The mobile robot positioning system of claim 1 wherein said first and second mobile robotic vehicles each comprise individual motorized robots with dedicated relative positioning systems which cooperate to determine dead-reckoning errors therebetween, such that said first and second mobile robotic vehicles are decoupled, and travel together in spaced apart relation.

10. The mobile robot positioning system of claim 9 wherein said relative positioning system further comprises a spaced apart array of receivers and at least one transmitter carried on a rotatable sensor arm on each of said vehicles, each of said transmitters for transmitting soundwaves from one of said vehicles to said receivers on the other of said vehicles, so as to determine both position and bearing between said first mobile robotic vehicle and said second mobile robotic vehicle.

11. The mobile robot positioning system of claim 10 wherein said rotatable sensor arm is further provided with a rotary encoder for monitoring geometric positioning of said receivers and said transmitter, said arms, receivers, and transmitters respectively cooperating between each of said vehicles to provide a relative positioning system therebetween.

12. A mobile robot positioning system for adapting an existing dead reckoning mobile robot in order to perform internal correction of dead-reckoning errors which comprises:

a passively towed mobile robotic trailer with a rotatable coupling for connecting said trailer to said mobile robot having a rotary encoder and a plurality of spaced apart rotary encoder wheels for performing dead-reckoning, said rotary encoder further ascertaining relative bearing between said mobile robot and said trailer;

error discriminating means for detecting and correcting systematic and non-systematic dead-reckoning errors of said robot by comparing said ascertained relative bearing between said robot and said trailer from said rotary encoder with an ascertained position and bearing of said robot;

wherein the robot and said trailer travel in a known and constant spaced apart relation while collaborating via said rotary encoder to measure bearing of the robot with respect to the trailer to obtain relative positioning information for correcting dead-reckoning errors of said robot.

13. A method for performing internal correction of dead-reckoning errors for a mobile robot positioning system having a first mobile robotic vehicle, a second mobile robotic vehicle spaced apart from the first vehicle, a relative positioning system for detecting relative bearing between said first and second vehicles, a dead-reckoning system for detecting position and bearing of the first vehicle, and error discriminating means for detecting and correcting dead-reckoning errors of said first vehicle relative to the said second vehicle, said method comprising:

detecting position and bearing of said second vehicle relative to a last known position;

detecting relative bearing between said first and second vehicles;

detecting and correcting systematic and non-systematic dead-reckoning errors of said first vehicle by comparing said detected relative bearing between said first and second vehicles from said relative positioning system with said detected position and bearing from said dead-reckoning system so as to perform error discrimination.

14. A method for performing internal correction of dead-reckoning errors for a mobile robot positioning system of claim 13 wherein said first and second vehicles travel in a spaced apart relation while collaborating via said relative positioning system to measure bearing of said first vehicle with respect to said second vehicle in order to obtain relative position information for correcting dead-reckoning errors of said robot positioning system.

* * * * *